Aug. 11, 1964 A. G. BODINE, JR 3,143,970
METHOD AND APPARATUS FOR PUMPING FLUIDS BY
OSCILLATORY IMPELLER ACTION
Filed May 25, 1959 10 Sheets-Sheet 5

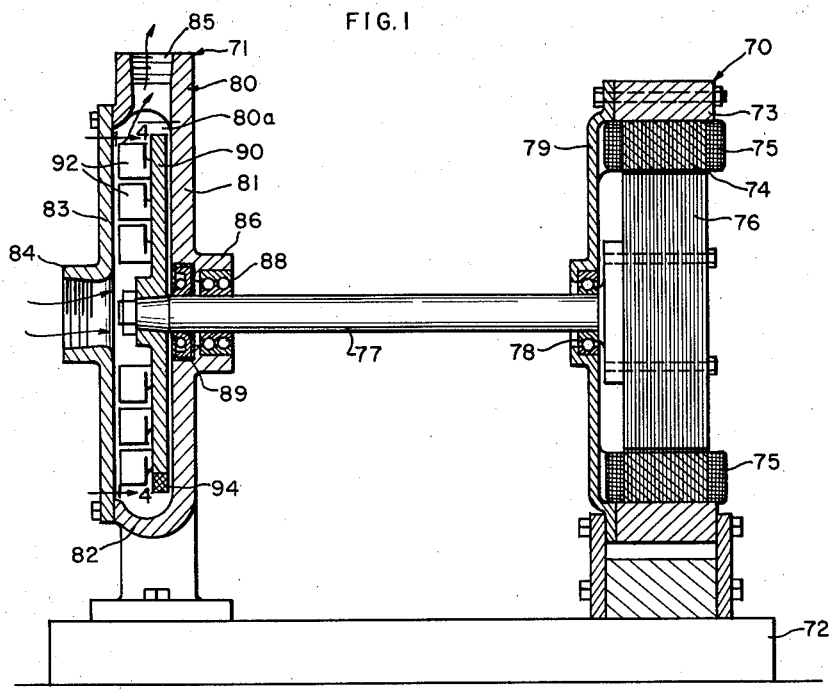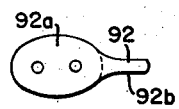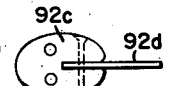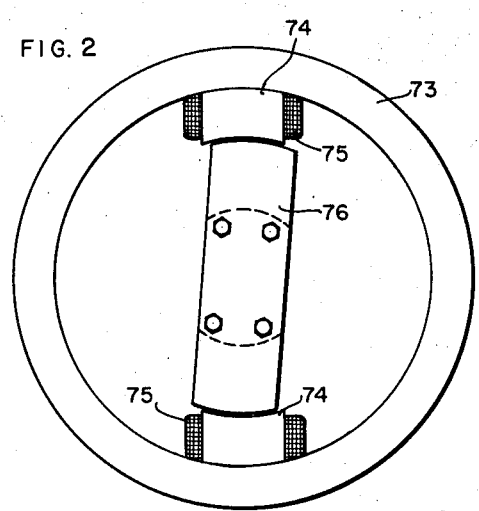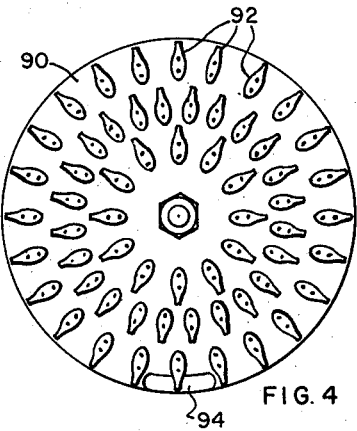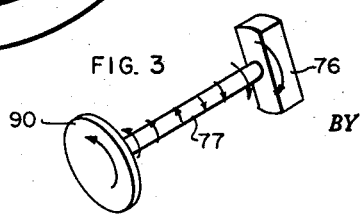

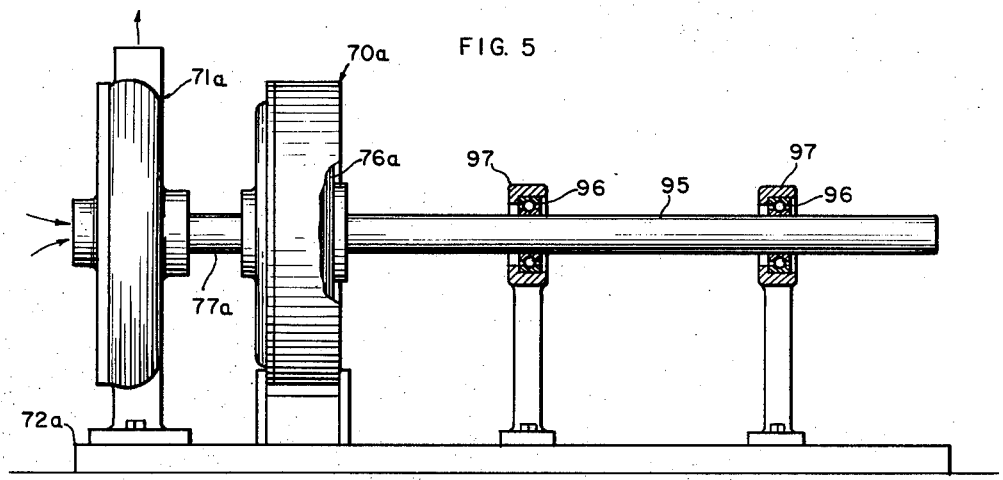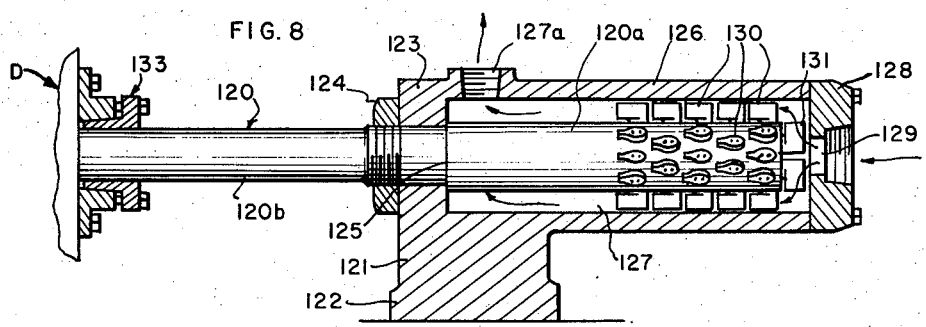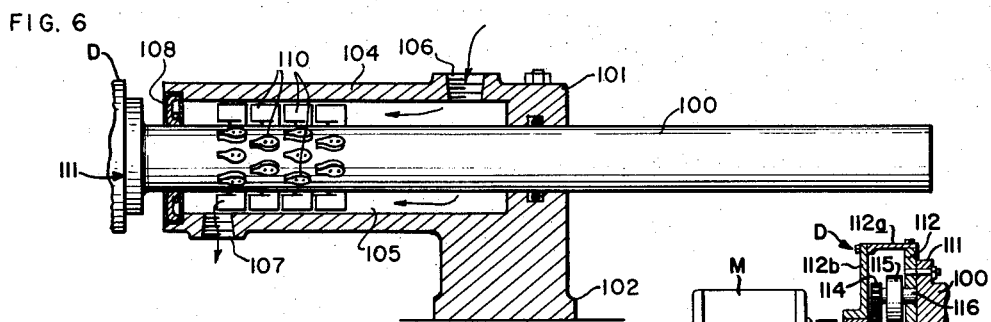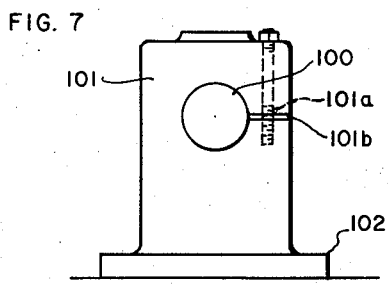

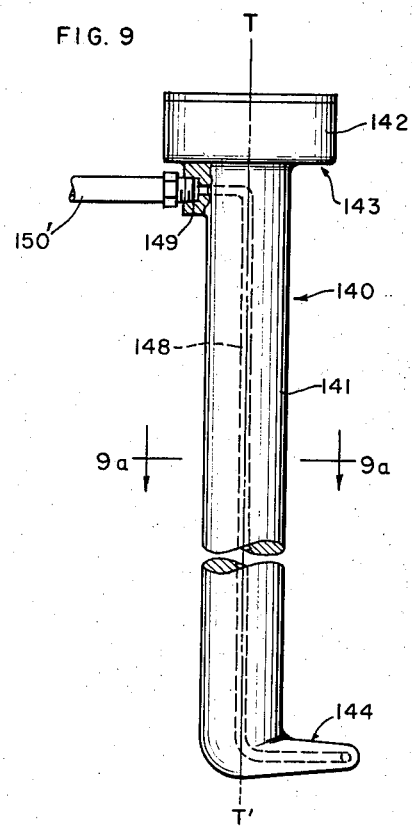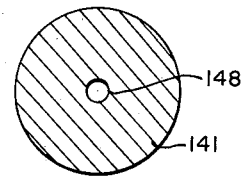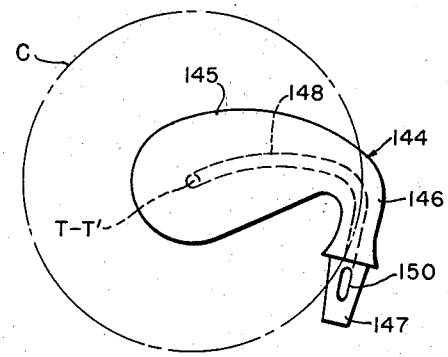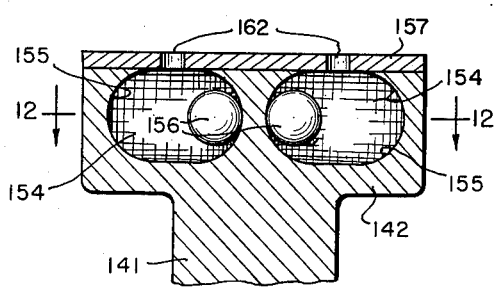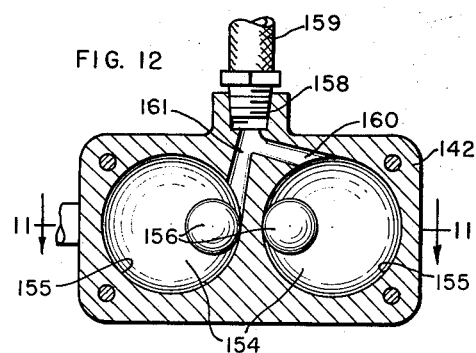

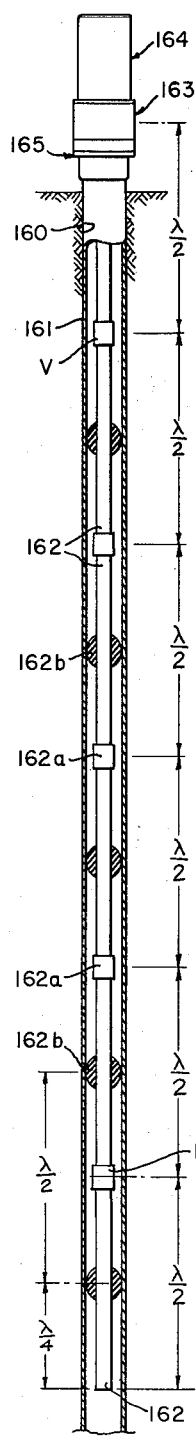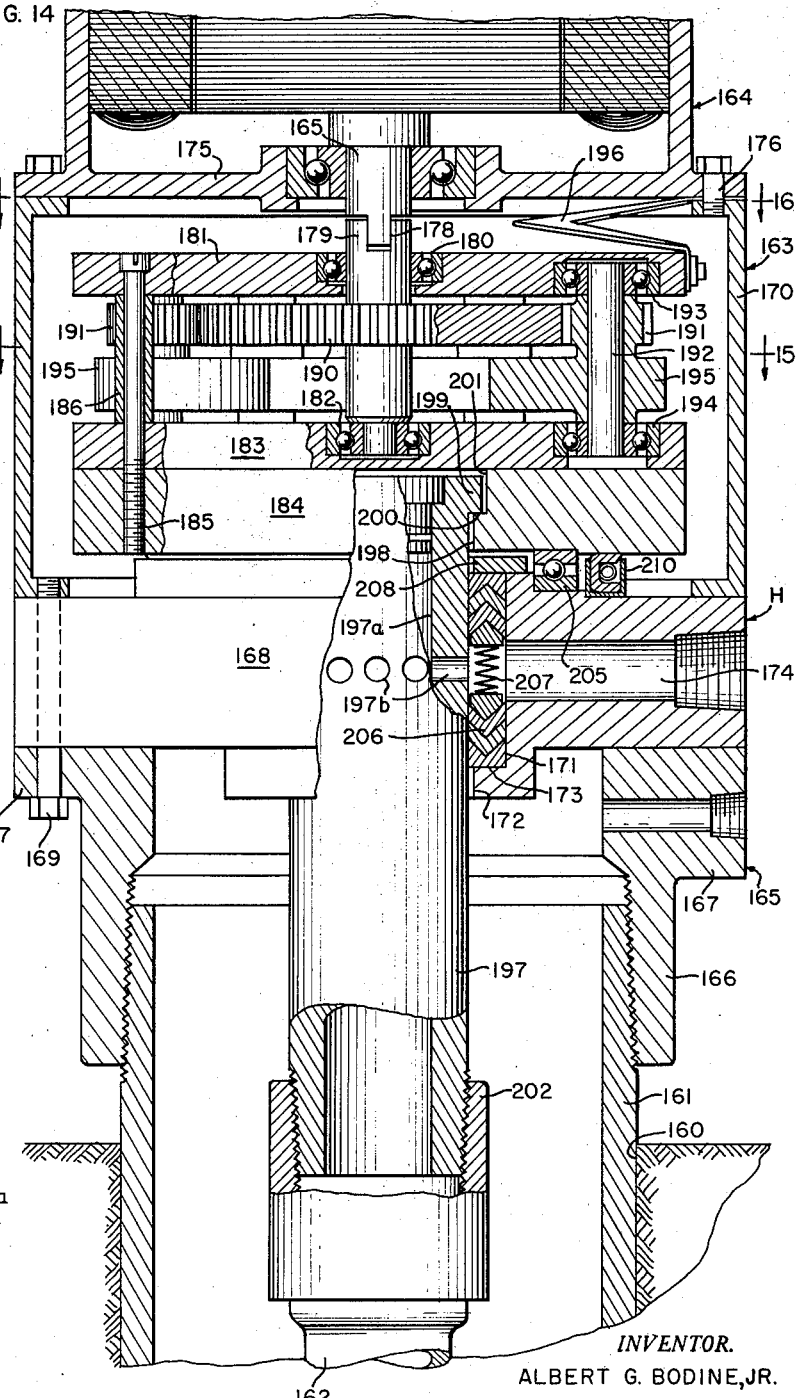

INVENTOR.
ALBERT G. BODINE, JR.
BY
*Lilly & Nyhagen*
ATTORNEYS

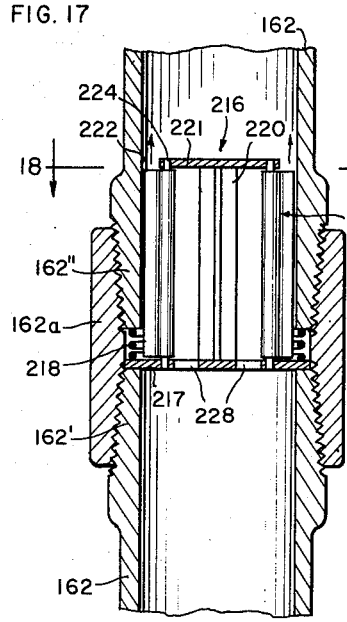
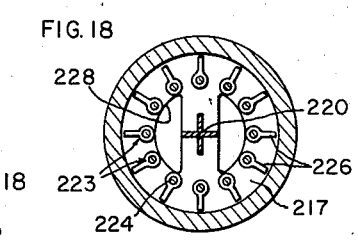
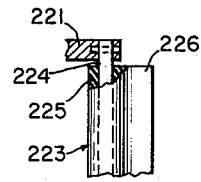
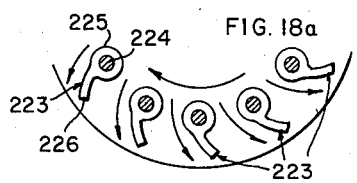
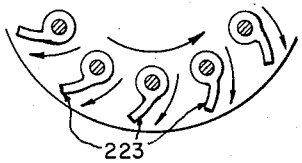
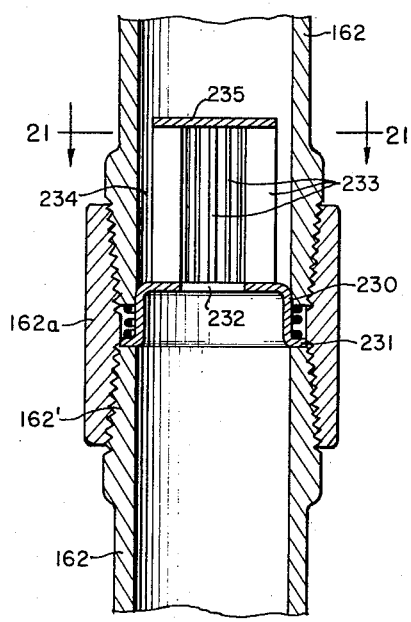
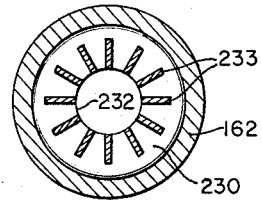
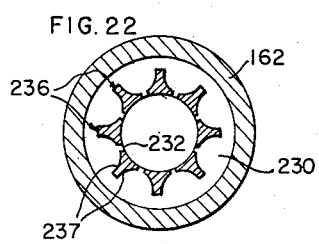

Aug. 11, 1964

A. G. BODINE, JR 3,143,970
METHOD AND APPARATUS FOR PUMPING FLUIDS BY
OSCILLATORY IMPELLER ACTION

Filed May 25, 1959

INVENTOR.
ALBERT G. BODINE, JR.

BY *Lilly & Nyhagen*

ATTORNEYS

Aug. 11, 1964 A. G. BODINE, JR 3,143,970
METHOD AND APPARATUS FOR PUMPING FLUIDS BY
OSCILLATORY IMPELLER ACTION
Filed May 25, 1959 10 Sheets-Sheet 8

INVENTOR.
ALBERT G. BODINE, JR.
BY *Lilly & Nyhagen*

ATTORNEYS

Aug. 11, 1964 A. G. BODINE, JR 3,143,970
METHOD AND APPARATUS FOR PUMPING FLUIDS BY
OSCILLATORY IMPELLER ACTION
Filed May 25, 1959 10 Sheets-Sheet 9

INVENTOR.
ALBERT G. BODINE, JR.
BY

ATTORNEYS

Aug. 11, 1964 A. G. BODINE, JR 3,143,970
METHOD AND APPARATUS FOR PUMPING FLUIDS BY
OSCILLATORY IMPELLER ACTION
Filed May 25, 1959 10 Sheets-Sheet 10
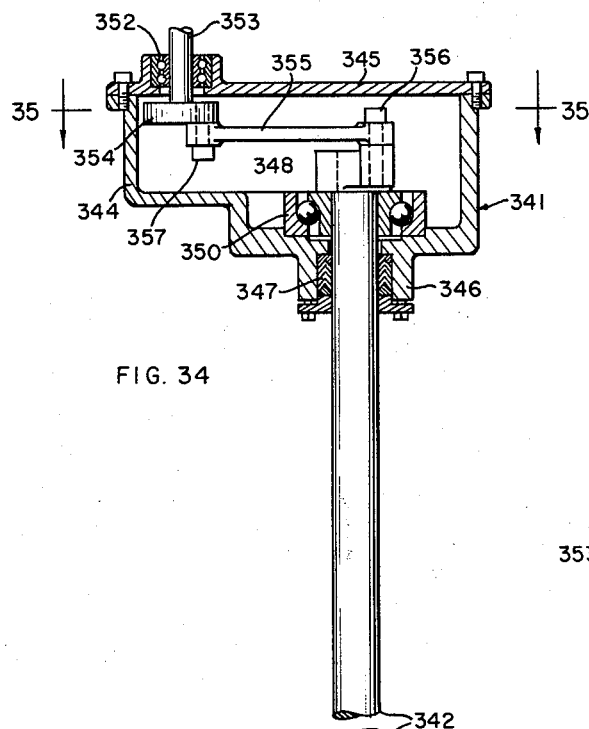
FIG. 34
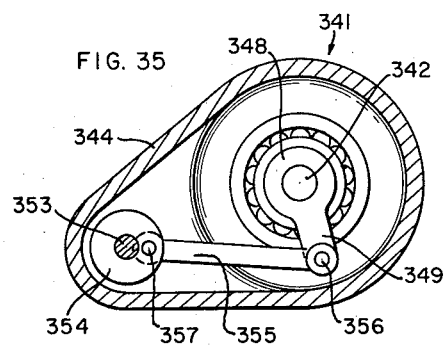
FIG. 35
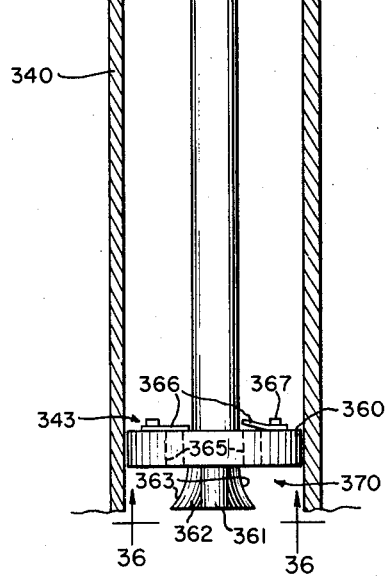
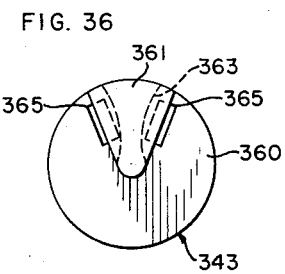
FIG. 36
INVENTOR.
ALBERT G. BODINE, JR.
BY
ATTORNEYS United States Patent Office 3,143,970
Patented Aug. 11, 1964

3,143,970
METHOD AND APPARATUS FOR PUMP-
ING FLUIDS BY OSCILLATORY IMPEL-
LER ACTION
Albert G. Bodine, Jr., Los Angeles, Calif.
(7877 Woodley Ave., Van Nuys, Calif.)
Filed May 25, 1959, Ser. No. 815,510
36 Claims. (Cl. 103—80)

This invention relates generally to the pumping or impelling of fluids, liquids, or fluent granular materials, hereinafter all referred to as fluids, and to a novel type of pumping method and pump wherein the impelling element has or is given certain novel motions, such as angularly or torsionally oscillatory motion, and wherein the impelling element is driven by an elastically oscillatory driver. A chief and preferred form of the invention, having certain unique advantages, involves an angularly oscillatory impelling element driven by a torsional oscillatory driver.

The invention is applicable in a variety of different fields, one major present application being in the pumping of deep oil wells, using, broadly, a sonic class of pump such as first disclosed in my prior Patent No. 2,444,912. Many applications will be found in fields other than deep well pumping, and one application, disclosed in my prior co-pending application Serial No. 517,880, filed June 24, 1955, now Patent No. 2,921,372, and entitled "Torsional Vibration Sonic Drill," of which the present application is a continuation-in-part, is in connection with a sonic torsional dental drill, wherein abrasive bearing fluid to facilitate drilling may be pumped in response to torsional oscillation of the tool.

Other applications are in the field of pumps for certain liquids in situations wherein shaft or other packings in contact with the liquids being pumped are to be avoided, as, for example, in pumping milk, where contamination of the liquid being pumped is to be avoided, or in pumping radioactive liquids, where leakage of dangerous substances must be prevented.

An object of the invention is the provision of a pumping system wherein fluent material is pumped by virtue of angular oscillation of an impelling element reacting therewith.

A major object is the provision of a pumping system wherein an angularly oscillatory impeller is driven by a torsionally oscillatory driver or transmission means.

A further object is the provision of such a pumping system further characterized in that the oscillatory impelling element is stabilized, i.e., given flywheel effect, by a torsionally elastically oscillatory device.

A further object is the provision of such a pumping system, wherein the oscillatory impelling element is both stabilized by and driven through a torsionally elastically oscillatory power transmission means.

A still further object is the provision of a pumping system as mentioned above, wherein the torsionally elastically oscillatory transmission means operates in a resonant frequency range.

A still further object is the provision of a pumping system wherein an angularly oscillatory impeller is stabilized by a torsionally elastically oscillating member of extended length, wherein a torsional standing wave is established.

Another object is to provide a pump characterized by absence of shaft or other packing in contact with the fluid being pumped.

Broadly, a pumping system typically illustrative of the present invention involves an angularly or torsionally oscillatory impelling device or element, driven from an elastically oscillating torsion means.

The impelling device may take any of various forms, one of which constitutes an angularly oscillatory impelling means including a check valve.

Another form of impeller involves a vane, or a plurality of vanes, angularly oscillated in the material to be pumped in such arrangement as to exert a reaction, i.e., a "lifting force" on the material whereby to accomplishe its propulsion. In some cases, the vanes cause flow axially of the axis of angular oscillation. In others they cause flow radially of such axis. In the latter case, they may make use of centrifugal force, either with or without the lifting force of a vane. Thus centrifugal force may be employed to propel the material; and centrifugal force action may be combined with the lift action of an oscillated vane.

In certain preferred or advantageous forms of the invention, the oscillatory torque driving the fluid impelling element is obtained from a torsionally oscillatory driving system characterized by mass and stiffness parameters such as to bring about resonance at a predetermined oscillation frequency, thereby to tune out force wasting oscillatory masses, and to afford a desirable stabilizing or flywheel effect on the system. The energy in the system alernates between potential energy stored in a torsionally deformed elastic member of the system at the end of each torsional movement, and kinetic energy of the oscillating mass of the system during each torsional movement. Each oscillatory stroke of the system is initiated by an acceleration due to "unwinding" of the torsionally elastically deformed member of the system, and such accelerations may readily be of a much higher order than the acceleration of gravity. Such high accelerations result in high pumping rates, as will appear.

The oscillatory system may incorporate an elastic, torsionally oscillatory member of extended length, torsionally oscillating on its longitudinal axis. Such elongated member has both mass and elasticity, and the constants of mass and elasticity are in this case distributed along the length of the member. The member may be oscillated at a frequency at which a torsional standing wave is established therealong, with regions of maximum torsional displacement, i.e., velocity antinodes, spaced by half-wavelength distances along the rod, and velocity nodes, or rather, velocity pseudo-nodes, intervening therebetween. Under such circumstances, the system operates in the region of resonance. The system may also, in some cases, be satisfactorily operated off resonance, in which case traveling torsional waves are transmitted along the member, and flywheel effect is lessened.

In certain cases, the torsionally oscillatory elongated member may serve as a means for transmitting the oscillatory driving torque from a drive to the angularly oscillatory impelling element. In such case, it functions both as a stabilizer, and as a power transmission means. In other cases, the torsionally oscillatory member is not in the power transmission path between the driver and the fluid impelling element, but is coupled to one or the other, and functions exclusively as a tuner and stabilizer.

The invention will be better understood from a consideration of the following detailed description of a representative selection of illustrative embodiments thereof, reference for this purpose being had to the accompanying drawings, in which:

FIG. 1 is a longitudinal sectional view through an embodiment of the invention;

FIG. 1a is a plan view of a vane employed in the embodiment of FIG. 1;

FIG. 1b is a similar view of an alternate form of vane;

FIG. 1c is a side elevational view of the vane of FIG. 1b;

FIG. 2 is a view of the oscillatory torque driver of FIG. 2, looking from the right;

FIG. 3 is a diagrammatic perspective view of the oscillatory system of FIG. 2;

FIG. 4 is a view taken in accordance with line 4—4 of FIG. 2;

FIG. 5 is a side elevational view, partly in section, of another embodiment of the invention;

FIG. 6 is a longitudinal sectional view of another embodiment of the invention;

FIG. 6a is a longitudinal section view of a driver for the apparatus of FIG. 6;

FIG. 7 is an end elevational view, looking from the right, of the embodiment of FIG. 6;

FIG. 8 is a longitudinal sectional view of another embodiment of the invention;

FIG. 9 is an elevational view of another embodiment of the invention;

FIG. 9a is a detailed section taken on line 9a—9a of FIG. 9;

FIG. 10 is a bottom plan view of the embodiment of FIG. 9;

FIG. 11 is a medial sectional view through the oscillatory torque driver of the embodiment of FIG. 9, being a section taken on line 11—11 of FIG. 12;

FIG. 12 is a section taken on line 12—12 of FIG. 11;

FIG. 13 is a somewhat diagrammatic view of a deep well pump in accordance with the invention, shown installed in a well bore;

FIG. 14 is a vertical sectional view through the oscillatory torque driver or generator of the embodiment of FIG. 13;

FIG. 17 is a view of a vane fluid impeller installed in the pump tubing of the embodiment of FIG. 13;

FIG. 18 is a section taken on line 18—18 of FIG. 17;

FIGS. 18a and 18b are fragmentary enlargements taken from FIG. 18 and showing operating positions of the vanes during operation of the pump;

FIG. 19 is a detailed sectional view taken from FIG. 17;

FIG. 20 is a view similar to FIG. 17 but showing a modification;

FIG. 21 is a section taken on line 21—21 of FIG. 20;

FIG. 22 is a view similar to FIG. 21 but showing a modification;

FIG. 34 shows a modified torsional well pump;

FIG. 35 is a section on line 35—35 of FIG. 34;

FIG. 36 is a view according to arrows 36—36 in FIG. 34.

Figure 15:
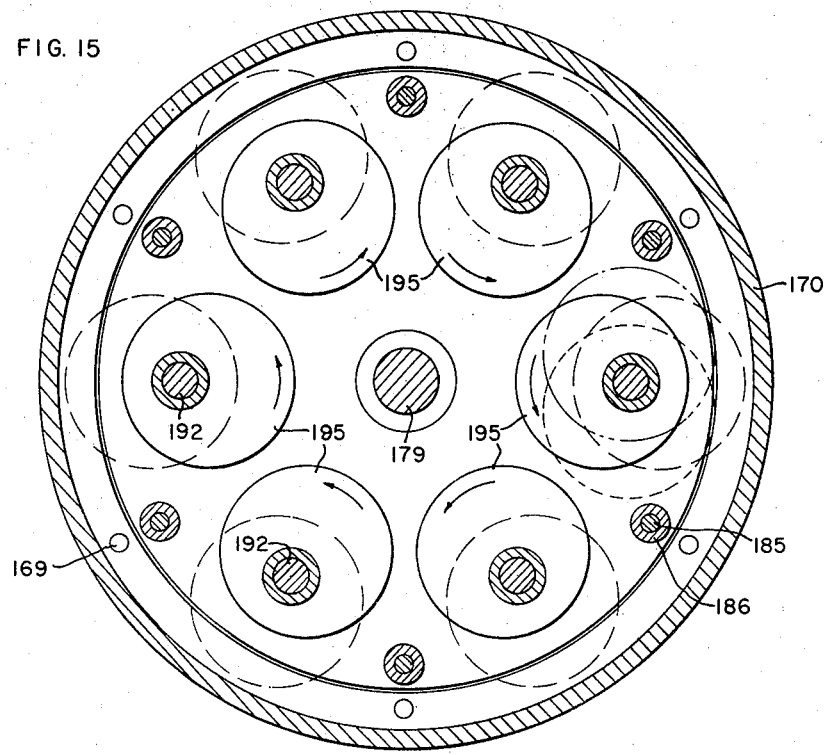
FIG. 15 is a transverse section taken on line 15—15 of FIG. 14.
Figure 16:
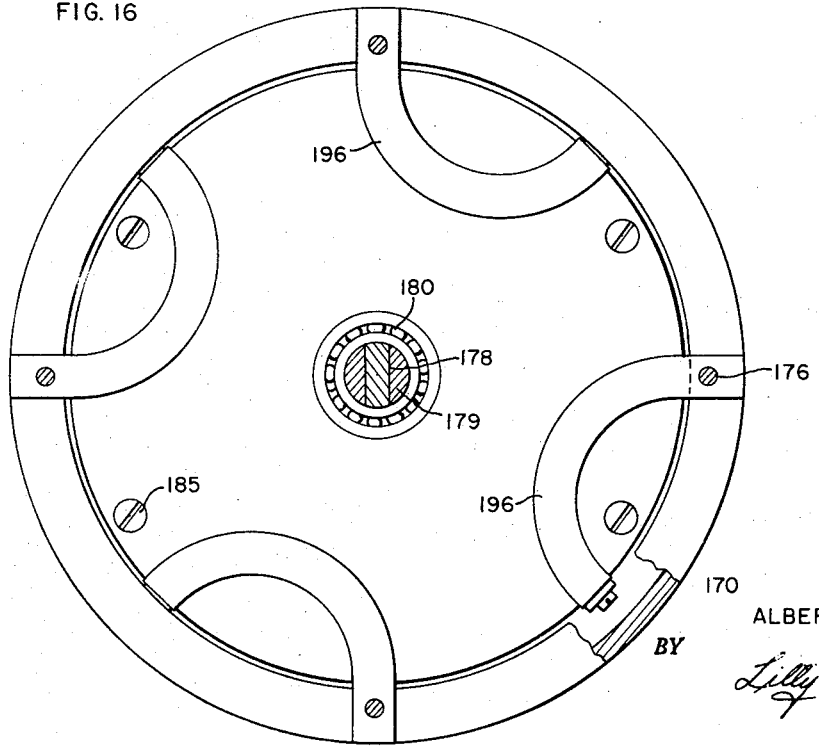
FIG. 16 is transverse sectional view taken on line 16—16 of FIG. 14.
Figure 23:
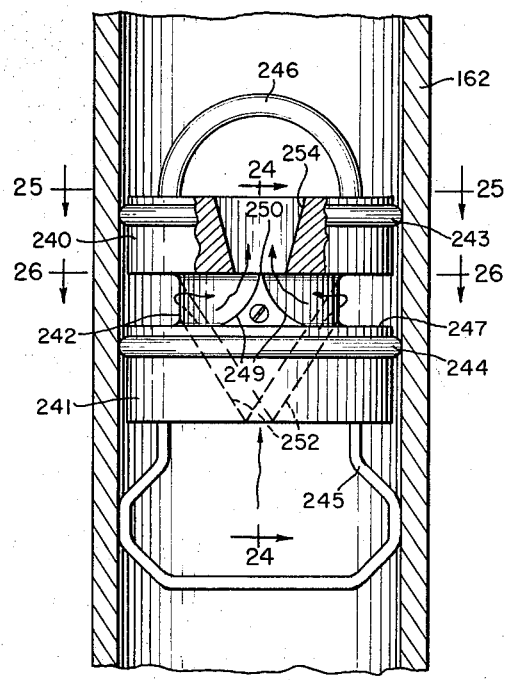
FIG. 23 is a view showing an alternative embodiment of fluid impeller adapted for use in the pump tubing of the embodiment of FIG. 13.
Figure 24:
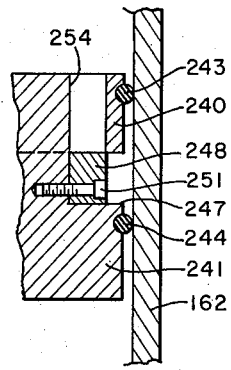
FIG. 24 is a detailed section taken on line 24—24 of FIG. 23.
Figure 25:
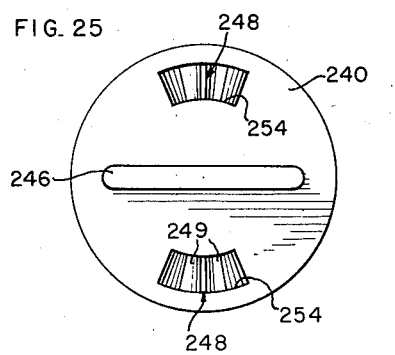
FIG. 25 is a view taken in accordance with line 25—25 of FIG. 23.
Figure 26:
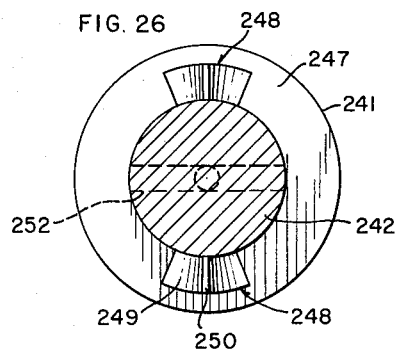
FIG. 26 is a section in accordance with line 26—26 of FIG. 23.

The invention is broadly applicable to pumping of liquids, gases, or fluent powdered or granular materials. Most applications are in the field of liquid pumping, and the invention will therefore be hereinafter described primarily and illustratively with liquid pumping in view, but without implied limitation thereto, and the term fluid will be used as generic to liquids, gases, and fluent powdered or granular materials.

In FIGS. 2–4 I have shown a simple form of pump characterized by torsional elastic oscillatory deformation and resonant operation, and in which the elastic stiffness and mass of the system are contributed primarily by mass and elastic elements of the "lumped constant" type. In this case, an oscillatory torque driver or generator is designated generally by numeral 70, and an oscillatory pump driven thereby by numeral 71, both of said units being shown as mounted on a suitable base 72. Generator 70 is of an electromagnetic type, comprising yoke frame 73 formed with diametrically opposite pole pieces 74 surrounded by windings 75, and an oscillating armature bar 76 mounted on a central shaft 77 which is journalled in bearing 78 carried in the end wall 79 of the generator. The yoke 73, pole pieces 74 and armature 76 are preferably laminated, according to conventional practice for prevention of eddy current flow. Energization of coils 75 causes magnetization of pole pieces 74 to opposite polarity, and rotates armature bar 76 toward a position of alignment therewith.

Turning attention now to the pump unit 71, the same has a generally circular and relatively flat housing 80 comprised of a rearward wall 81, a peripheral sidewall 82, and a removable front wall 83, the wall 83 has a central tubular boss 84 screw threaded for connection of a conduit coupling not shown, through which fluid is supplied to the pump.

The sidewall 82 of the housing has a peripheral discharge port 85, adapted for connection of a conduit coupling and discharge conduit not shown. The aforementioned shaft 77 extends into the interior cavity of housing 80 through a tubular boss on wall 81, the shaft 77 being supported by a bearing 88 carried within boss 86, and a fluid seal being provided around shaft 77 as indicated at 89. On the end shaft 77 inside housing 80 is an oscillatory pump disc 90, spaced closely to the inner surface of wall 81, and whose opposite face is spaced sufficiently from housing wall 83 to accommodate a purality of radially disposed vanes 92, which may be disposed in a series of circular arrays of different radii, for instance, as shown in FIG. 4. Preferably, the vanes of successive rows are staggered, as illustrated. Each vane 92, as shown in FIGS. 1 and 1a, comprises a thickened body part 92a mounted on disk 90, and a tapered or thin vane or tail part 92b. Preferably, though not essentially, the vanes are composed of a flexible material such as rubber, or a plastic such as nylon, Teflon, etc. The flexibility characteristic is of course useful only in the tail part 92b, giving it a flexing propulsive action, when the disk 90 is oscillated, similar to that of a fishes tail, or swim fin. FIGS. 1b and 1c show a modified form of impeller, comprising a body part 92c, adapted to be fixed to the disk 90, and a flexible, plate-like elastic tip or vane 92d carried thereby. The tip 92d may be composed of thin stainless steel, or a phenolic plastic, nylon, Teflon, rubber, etc. I may also employ rigid vanes or "paddles," typically of the form shown in FIGS. 1 and 1a, and the convergent side surfaces of which propel the fluid when the vanes are oscillated by the disc 90. When disc 90 is oscillated, the vanes 92 act as fluid impellers to propel the fluid between disc 90 and housing wall 83 radially outward across the disk from central inlet 84 into the peripheral housing channel 80a leading to outlet 85. It will be evident that the vanes in the outer rows move with increasing velocity and acceleration, giving progressively increasing pumping effort in the direction of fluid flow.

The oscillatory system comprised of armature bar 76, pump disc 90, and the intervening shaft 77, comprises a torsional oscillator, of which members 76 and 90 constitute oscillatory mass elements of the "lumped constant" type and shaft 76 constitutes a "lumped constant" torsional spring. This torsional system is diagrammatically represented in FIG. 3. As armature bar 76 rotates through its oscillatory stroke in one direction, the pump disc 90 rotates through an oscillatory stroke in the reverse direction, the elastic shaft 77 twisting about its longitudinal axis to accommodate such action. A mid-point of the shaft remains stationary, and on opposite sides of this mid-point, or "neutral point," the shaft twists in opposite directions, the angular displacement increasing progressively from its mid-point towards the mass elements 76 and 90, as indicated by the arrows. Assuming no fluid flow through the pump, and neglecting the shaft 77, the respective angular displacements of the oscillatory members 76 and 90 are, of course, inversely proportional to their moments of inertia, and the product of the moment of inertia and angular velocity for the two elements 76 and 90 will be equal. With fluid flow through the pump, a certain coupled-in mass owing to the reaction of the fluid mass on the vanes increases the effective moment of inertia of the pump disc 90, and a new balance between products of moment of inertia and angular velocity is established. At the end of each oscillatory stroke, energy is stored in the elastically deformed shaft 77. The shaft then "unwinds," and twists in the reverse direction, the stored energy changing to kinetic energy of the oppositely rotating armature 76 and pump disc 90. At the end of the latter stroke, the energy is again stored in the torsionally deformed shaft. The device thus constitutes a torsional mechanical oscillator, and when started, will oscillate as described at a natural or resonant frequency determined by the elastic stiffness of the shaft 77 and the mass and mass distribution, or moments of inertia, of members 76 and 90. The system is preferably biased normally to assume a neutral position with the armature bar somewhat angularly displaced from alignment with poles 74, and this may be accomplished in various ways, as for example, by providing the disc 90 with a heavy lead insert 94 which is at the bottom when the armature bar 76 is at an angular disposition relative to the pole pieces 74, as shown in FIGS. 1 and 2.

The pole windings 75 may be fed with either a pulsating direct current, or an alternating current. Upon each energization of the windings, armature bar 76 is pulled toward alignment with pole pieces 74. Assuming energizations of the winding 75 to occur at a frequency approximating the resonant frequency of the torsional oscillator, the system will thereby be set into oscillation at the resonant frequency as heretofore described. At resonance, torsional oscillation at substantial angular displacement is readily attained. Power is supplied to the oscillatory system once each cycle by energization of windings 75. The torsional oscillation so imparted to disc 90 causes fluid pumping in the manner already explained. Operation at resonance is of advantage in obtaining large angular displacements of the pump disc, in stabilizing the system, and in tuning out oscillating masses, which otherwise are wasters of force. It will be seen that the pumping disc accelerates through the first half of each of its torsional strokes in response to elastic restoration forces within the torsionally elastically deformed shaft 77; and since these elastic restoring forces are very great, very high angular accelerations are obtained, and correspondingly high pumping effort developed.

This is an important advantage common to all of the remaining embodiments of the invention.

A further improvement in accordance with the invention, particularly applicable in the pumping system of FIG. 1 and of those embodiments hereinafter described which use impelling vanes, is the use of tuned resilient vanes. That is to say, the tail portions of the vanes are made flexible and resilient or elastic, and of such elastic stiffness in relation to their mass and distribution of mass, and to the coupled-in mass of the fluid worked against by the vanes, as to have a resonant frequency corresponding to the torsional oscillation frequency of the pumping system. Their amplitude of lateral deflection is thereby resonantly amplified, and additional pumping effort gained. It is to be understood that all of the vane type pumps disclosed herein may incorporate this tuned vane feature.

It is also an advantage to form the disc 90 that mounts the vanes on shaft 77 to have a substantial degree of torsional elastic compliance or deformation in response to acceleration thereof in reverse directions, which increases the stroke distance, velocity and acceleration of the vanes, and so increases pumping effort. Such torsional compliance is enhanced by forming the disc with a thin section, or generally radially extending thin web portions, or slots. It will be seen that tuning of the entire oscillatory system is affected by this torsional compliance, which, if made substantial, should be taken into account. By tuning the disc to have a resonant frequency for torsional deflection in the resonant frequency range of the system as a whole, maximized torsional oscillation of the disc is attained.

In FIG. 5, I have shown a modified pumping system, analogous to that of FIGS. 1 to 4 in general respects, but wherein resonance is determined and the system stabilized at the resonant frequency by means of a relatively extended torsionally oscillatory shaft of a distributed constant type. In this case, the system includes an oscillatory torque generator 70a, which may be similar to that of generator 70 of FIGS. 1 to 4, an oscillatory pump 71a which may be similar to the pump 71 of FIGS. 1–4, and a relatively extended shaft 95, of elastic material, extending axially from oscillatory armature bar 76a, and secured firmly thereto. As here shown, the shaft 95 is supported for free torsional oscillation in bearings 96 carried by supporting standards 97 erected from base 72a. Alternatively, as will appear later, the shaft 95 might be supported by means of a clamp at its midpoint. In this case the coupling shaft 77a between the armature 76a of torque generator 70 and the vane carrying disc pump 71a is short, so that it functions as a relatively rigid coupling, whereby the armature bar 76 and the oscillatory pump disc oscillate always in the same direction, rather than in opposed directions, as in the pump of FIGS. 1–4.

Thus the oscillatory unit consisting of armature bar, pump disc, and coupling shaft 77a, all coupled to the end of torsion shaft 95, is driven at an oscillation frequency which is a resonant frequency of shaft 95 and coupled-in mass of the armature and pump disc for a torsional mode of standing wave vibration. The selected frequency may correspond, for example, to a frequency for a substantially half-wave length form of torsional oscillation of shaft 95 and coupled in oscillatory mass of the generator 76a and pump 71a. In such case, the shaft 95 divides longitudinally into two portions, to one of which is directly coupled the oscillatory generator armature and pump disc. These two portions elastically twist in one direction and then the other, the two portions twisting always in opposed directions. The torsional forces in the portion of the shaft coupled to the oscillatory generator armature and pump element are always balanced by opposite torsional forces in the remaining portion of the shaft. Between these two portions, the shaft stands substantially stationary. That is to say, a node of a standing wave exists at this point, while antinodes occur at the end portions of the shaft. The shaft 95 has several desirable functions. Possibly of most importance, it "tunes out" oscillatory masses of the generator and pump, and so reduces or eliminates wastage of force in driving these elements. It also increases the angular displacement of the oscillatory members of the generator and pump. Finally, it has an energy storage property, and acts as a stabilizer for the system, somewhat analogous to a flywheel. The resonant torsionally elastic system of FIGS. 1–4 also possesses these advantages, but is somewhat more difficult of design for operation at advantageous oscillation frequencies.

In FIGS. 6 and 7 I have shown another embodiment of the invention, utilizing a torsionally elastic shaft of extended length of a distributed constant type, somewhat similar to that employed in the apparatus of FIG. 5, and which contributes certain similar properties to the system, but which is utilized in a quite different manner. The extended elastic shaft is designated generally at 100 in FIG. 6. It is tightly mounted substantially at its midpoint, or stationary point, in a clamp fixture 101 having a footing 102 adapted for support on a suitable base. As shown in FIG. 7, the fixture 101 may be split on one side, and tightly clamped to the shaft by a screw 101a crossing the split. A soft gasket 101b may be used in the split. A fluid packing of the O-ring type is placed in fixture 101 around shaft 100 to seal against fluid leakage. A sleeve-like jacket 104 extends from fixture 101 nearly to one end portion of shaft 100, being annularly spaced from the latter to form a fluid channel 105. This jacket 104 is formed near mounting fixture 101 with an inlet port 106 suitably adapted to receive a coupling on the end of a fluid inlet conduit, not shown, and jacket 104 is further provided, near its extremity, with a fluid discharge port 107, also adapted to receive a coupling, not shown, to which is connected the discharge conduit, not shown. The extremity of jacket 104 carries a flexible fluid seal 108, contacting shaft 100 and forming a sealed closure for the fluid channel 105. A plurality of longitudinally disposed fluid impelling vanes 110 are mounted on shaft 100 within jacket 104, being directed longitudinally of the shaft, and pointing in the direction of fluid outlet 107. As shown, the vanes are in successive rows along the shaft, with vanes of successive rows preferably staggered. These vanes 110 may extend all the way from inlet port to discharge port 107, but since in the operation of the device, the torsional motion of shaft 100 is fairly small in the region adjacent the mounting fixture 101, the vanes may be confined principally to the portion of shaft 100 that is more remote from mounting 101, somewhat as illustrated. The vanes 110 are again illustratively any of the type shown in and described in connection with the FIGS. 1 to 1c.

The extremity of shaft 100, beyond jacket 104, is shown to be provided with a flange 111, and this flange may be secured to the oscillatory end plate 112 of an oscillatory torque driver D. The oscillatory torque driver D may comprise any suitable device for alternately torquing the shaft 100 in reverse directions about its longitudinal axis. As here shown (FIG. 6a), it embodies a housing made up of end plate 112, peripheral sidewall 112a, and opposite end plate 112b. End plate 112b has a central boss containing a bearing for a relatively short and stiff gear shaft 113, coupled to the shaft of motor M. On the inner end of shaft 113 is a spur gear 113a, which meshes on opposite sides with a pair of spur gears 114 driving a corresponding pair of eccentrically weighted rotors 115. The rotors 115 contain bearings which rotatably mount them on stub shafts 116 projecting from housing end plate 112. As will be seen, the eccentrically weighted rotors 115 are formed with masses displaced to one side of their axes of rotation, and the two rotors are so phased that these unbalanced masses approach and recede from one another in unison. Forces in the direction of a line intersecting the axes of the two rotors are accordingly balanced out. On the other hand, alternating force components exerted by the two unbalanced rotors along direction lines at right angles to the line intersecting the rotor axes are opposed, but exerted on opposite sides of the longitudinal center line or axis of the oscillatory torque driver or generator D, and therefore co-act to create an alternating or oscillatory couple, i.e., an oscillatory torque. Thus, an oscillatory torque is exerted through shafts 116 to housing plate 112, and in turn to shaft 100. This oscillatory torque angularly oscillates the shaft 100 about its axis 32a, only fragmentarily indicated in FIG. 6, and which may be of the same nature shown at 32 in FIG. 1. Shaft 100 has one or more torsional modes of standing wave vibration, the simplest of which is the half-wave mode, wherein the two half-length portions of the shaft elastically twist in opposite directions. That is to say, each half-portion twists in one direction and then the other, with the angular displacement increasing from zero at the clamped midpoint to a maximum at the extremity; and the two half-portions always twist in opposite directions. Under such conditions, the shaft is said to have a velocity node at the midpoint, and velocity antinodes at the two extremities. The shaft is set into such oscillation by alternating torsional force impulses, i.e., an alternating force couple, delivered from the oscillatory driver 32a. The vanes 110 on the oscillatory half-portion of the shaft 100 inside the jacket 104 propel fluid within jacket 104 in the direction from inlet 106 to outlet 107, the impelling action being similar to that of the previously-described embodiments of the invention. Because the angular displacement of shaft 100 is greatest at its extremity, it is preferable to orient the vanes for fluid propulsion in the direction shown, so that the fluid experiences progressively more drive. It will be evident, however, that by sacrifice of this advantage, the vanes might be reversed in direction, so as to cause fluid flow through the system in the reverse direction.

In FIG. 8 I have shown another embodiment of the invention generally resembling that of FIGS. 6 and 7, with certain differences and advantages as will be described. There is again provided an extended elastic shaft, here designated by numeral 120, tightly mounted substantially at its midpoint in a fixture 121, having a footing 122 adapted for support on a suitable base. In this case, the fixture 121 provides a bored wall, 123 in which shaft 120 is snugly fitted, and a large lock nut 124 threaded onto shaft 120 and set up tightly against wall 123, in cooperation with a shoulder 125 on shaft 120 in engagement with the inner side of wall 123, serves to clamp the shaft tightly to the fixture. This mounting affords a fluid tight seal, and obviates the necessity for shaft packing, seal rings, or the like. The shoulder 125 divides shaft 120 into two portions, 120a and 120b. A sleeve-like jacket 126 extends from fixture 121 around shaft portion 120a somewhat beyond the extremity thereof, being annularly spaced from the shaft to form a fluid channel 127. This jacket 126 is formed near wall 123 with a fluid outlet 127a, adapted to receive a coupling on the end of a fluid discharge conduit, not shown. Secured to the extremity of this jacket 126 is an end fixture or wall 128, formed with an inlet port 129, and threaded, as shown, for reception of a coupling on the end of the fluid inlet conduit, not shown.

On approximately the outer half of the portion 120a of shaft 120 housed within jacket 126 are a plurality of axial flow impeller vanes 130, of the same nature as in FIG. 6, but in this case shown illustratively and optionally as reversed in direction. Preferably, though optionally, a plurality of radially-oriented vane-type impellers 131 are mounted on the extremity of shaft portion 120a just inside end wall 128, giving additional propulsion. This latter system is thus a "mixed-flow" pump, being partly radial flow and partly axial flow.

The opposite extremity of shaft 120 is coupled to an oscillatory torque driver or generator D, which may be illustratively of the type shown at 32 in FIG. 6a, and which is only fragmentarily illustrated in FIG. 8. The coupling between this oscillatory driver and the extremity of shaft 120 is in this case shown to be in the nature of a conventional clamp collet, designated generally at 133.

The oscillatory driver sets shaft 120 into torsional standing wave vibration, of the same nature as described in connection with FIG. 6. The axial flow vanes 130 on the portion 120a of the torsionally oscillating shaft propel fluid through channel 127 from inlet 129 to outlet 127a in the same general manner as described in connection with FIG. 6. The radially-oriented vanes 131 act to impel the fluid received from inlet 120 in a radailly outward direction, and thus participate in the pumping action. The pump of FIG. 8 will be seen to differ from the pump of FIGS. 6 and 7 in that in the case of FIG. 6, the impelling vanes are on the portion of the shaft between its center mounting and the oscillatory driver, whereas in the case of FIG. 8, the impeling vanes are on the portion of the shaft which is on the opposite side of the center mounting from the oscillatory driver. The pump of FIG. 8, of course, has the further advantage of the addition of the radially-oriented impeller vanes 131.

The axial vanes 130 of the embodiment of FIG. 8 may optionally, and with some definite advantage, be reversed in direction, as in the arrangement shown in FIG. 6, so as to pump in a direction the reverse of that shown. The advantage of the reversed arrangement is that the impellers oscillate through progressively greater distances in the direction of the extremity of the shaft, and the corresponding progressively increasing pumping effort in the direction of fluid flow is of obvious advantage. With the vanes 130 reversed in direction, the end vanes 131 may be omitted. It is deemed unnecessary to illustrate the reversed vane arrangement for FIG. 8 since such arrangement is illustrated in FIG. 6.

The pump of FIG. 8 will be seen to be unique in that no fluid packings are necessary. This adapts the pump to uses such as for pumping milk, where it is desirable to avoid contaminating the fluid pumped by packing, and to pumping of radioactive fluids, where potential leakage of dangerous fluids is to be positively prevented.

FIGS. 9 to 12 show another embodiment of the invention, in an application to a drill suitable for dental drilling or other purposes. This subject matter was first disclosed in my above mentioned parent application entitled Torsional Vibration Sonic Drill, Serial No. 517,880, filed June 24, 1955, being the parent application of which this application is a continuation-in-part. The drill, designated generally by numeral 140, comprises an elastic torsional shank or bar 141 formed preferably of a suitable alloy steel having good elastic fatigue properties, preferably of circular section. One end of this shank or bar 141 is formed with an enlarged head or block 142 forming the housing of an oscillatory torsion generator 143.

The other end of the bar 141 is formed with an integral, laterally-extending outwardly-tapering arm 144, comprising a radial inner portion 145, and an outer portion 146 bent or turned, in a plane transverse to the bar 141, through substantially 90°, so as to lie substantially tangent to a circle C whose center lies on the longitudinal torsion axis T—T' of the bar 141. This torsion axis may be displaced slightly from the longitudinal axis of symmetry of the bar owing to the unbalanced mass of the arm 144. The tip of this right angle bent arm portion 146 may comprise the bit, here designated by the numeral 147.

A passage 148, having a port at 149 to which supply tube 150 may be coupled, leads longtiudinally through the bar 141 and through the arm 144 to one or more discharge orifices 150 adjacent the bit 147. A fluid suspension of abrasive particles may be fed through this passage 148 and out the orifices 150 to the drill site. This abrasive fluid is self-propelled through the passage 148 and out the orifices 150 by the torsionally oscillatory motion of arm 144, as will be explained hereinafter.

The torsion generator 142 is formed, in a plane transverse of the bar, with a pair of circular cavities 154 having concave peripheral bearing surfaces forming raceways 155 for a pair of steel inertia balls 156. Each ball 156 is preferably of materially lesser radius than the radius of transverse curvature of the raceway, so as to afford a small area of bearing contact between the ball and the raceway. As here shown, the two raceway cavities 154 are symmetrically spaced on opposite sides of the torsion axis T—T'. The raceway cavities are sunk into generator head or block 142, and are closed at the top by a cover plate 157 secured in position by suitable fastening screws. The block 142 is formed at one side with an air inlet port 158, suitably threaded for coupling to air hose 159. Expanding super-sonic nozzle passages 160 and 161 lead from this port 158 to the two raceway cavities 154, joining the latter tangentially, as shown, it being noted that the tangential inlets to the raceway cavities are so disposed as to introduce the air streams to the two cavities with the same spin direction. Axial air discharge ports 162 exhaust the air from the axial regions of the raceway cavities 154. Air introduced to the two cavities by the passageways described causes the two balls 156 to spin about the raceways, the direction of spin being thus the same for both balls.

Each of the two spinning balls exerts a centrifugal force on the generator case. As previously mentioned, the direction of spin of the balls is the same for both. Initially, the balls spin at random phase relations to one another. However, by proper adjustment of the pressure of the air streams driving the balls, they are driven at a number of revolutions per second approaching or approximating the resonant frequency of the bar 141 for the desired torsional mode of elastic standing wave vibration. Notwithstanding the initial random phase relations of the balls, an automatic process of phase adjustment of the balls takes place as soon as the spin frequency of one of the balls approaches the resonant frequency of the bar for a mode of torsional standing wave vibration. At the inception of this process, a slight beginning resonant torsional vibration response of the bar enables the bar, by back reaction, to obtain a slight beginning control over the phase relations of the balls, causing the balls to move toward relative positions wherein they co-act better with one another to jointly drive the bar in the resonant torsional mode which has been started. The process then very rapidly expands, the torsionally oscillating bar reacting back on the balls to further and further improve their phase relations, and the balls driving the bar harder and harder as their phase relations improve, so that the bar is quickly brought to its maximum amplitude of resonant torsional vibration. In this action, considered in more detail, the two balls automatically seek and find the phase relations of maximum advantage, characterized by linear movement of the balls both longitudinally and laterally of the elongated generator case always in opposition to one another, so that force components both longitudinally and laterally of the generator case are completely balanced. Initial tendency for linear vibration of the generator case in any and all directions is thus neutralized. The balls cooperate with one another, however, to exert an oscillating force couple on the generator about the torsion axis T—T', and therefore also on the corresponding end of the bar 141, which oscillating force couple drives the bar in the desired mode of torsional vibration. Under these conditions, the balls are "locked in" at the resonant spin frequency, and hold their described phase relations in which a pure couple type of force oscillation is exerted by them on the generator case, driving the elastic bar in the described mode of torsional vibration. As previously described, the balls are controlled, in turn, by back reaction from the bar to hold their resonant spin frequency and described phase relations. With these conditions established, the torsional vibration of the bar attains its maximum amplitude.

Turning attention now to the end of the bar 141 carrying the arm 144, torsional oscillation of this end portion of the bar about the torsion axis T—T' torsionally oscillates the arm 144 and the bit carried thereby.

A half wave mode of torsional resonant vibration is thus attained, the two half lengths of the bar twisting always in opposite directions. The amplitude of the torsional standing wave in the bar is zero at the mid-point of the bar, which is the location of a velocity node of the wave, and increases in both directions to maximum values at the two ends of the bar, which are the location of velocity antinodes of the wave.

In the operation of the drill, an abrading bearing fluid is fed through or into the passageway 148. This fluid, discharged at the site to be drilled, results in impacting of the abrasive particles against the surface to be drilled, and the cutting action appears to be due primarily to abrasion of the material by the abrasive particles.

As mentioned hereinabove, the abrasive bearing fluid is propelled through the tool by the oscillatory action of the arm 144. To understand this action, assume an imaginary curved surface intersecting the central longitudinal axis of passage 148, and intersecting also the torsion axis T—T'. It may be seen that the side wall surfaces of the passage 148 on opposite sides of this plane constitute, in effect, opposed vane surfaces or vanes, each of effective area equivalent to the projected area of the vane surfaces on the assumed curved surface. These vane surfaces oscillate torsionally about the axis T—T', and act to impel the fluid in the passage in an outward direction. In this case, centrifugal force also acts to pump the fluid radially outward through the passage in the torsionally oscillating arm. It is found in practice that fluid supplied to the inlet to passage 148 is ejected from the discharge orifice 21 with considerable pressure and velocity, a substantial amount of energy being transferred to the fluid from the torsionally oscillating arm.

A principal present form and application of the invention is in the field of deep oil well pumping, and an illustrative embodiment of the invention for that field is shown in FIGS. 13–19, inclusive. In FIG. 13, which is somewhat diagrammatic, numeral 160 designates a well bore, lined with casing 161, understood to be perforated in the usual manner at its lower end, and numeral 162 designates a string of elastic pump tubing which is torsionally oscillated by means of torsional oscillation generator 163 located above the ground surface. Tubing string 162 is made up of lengths of steel tubing connected by conventional couplings 162a, and is provided with a plurality of bearing elements 162b designed to centralize the tubing in the casing, and to afford low-friction and non-wearing contact therewith. They may be composed of a plastic, such as a fabric filled phenolic. Since these bearing elements form no part of the present invention, no detailed disclosure is deemed necessary herein. Generator 163 is driven from an electric motor 164 (see also FIG. 14) arranged with its shaft 165 vertical, as indicated. The generator 163 is mounted on casing head H, which is in turn mounted on the upper end of casing 161.

Considering casing head H in more particular, it will be seen from FIG. 14 to be made up of a lower member 165 comprising a ring 166 which is internally threaded and screwed onto the threaded upper end of casing 161, and is provided at the top with a flange 167, together with an upper relatively thick plate 168. Screws 169 reach upwardly through flange 167 and through plate 168 to thread into an internal flange at the bottom of generator housing 170 to secure these members tightly in assembly. A vertical axial bore 171 extends downwardly in plate 168, meeting a reduced counterbore 172 to form a shoulder 173 adapted to seat later described packing. A radial bore 174 extends outwardly in plate 168 from bore 171, being screw threaded at its outer end for reception of a coupling on the end of the flow line, not shown.

The housing for electric drive motor 164 has a lower end plate 175 which is connected at 176 to the upper inwardly turned flange of generator housing 170. The lower end plate of the drive motor thus serves as the upper end plate for generator 163. Motor shaft 165 extends downwardly into generator housing 163, and is coupled at 178 to axial generator shaft 179. Shaft 179 is journalled near its upper end in a bearing 180 seated in an upper oscillator end plate 181, and has a lower reduced extremity journalled in a bearing 182 seated in a frame plate 183 spaced below plate 181. The plate 183 rests on top of a heavy tubing suspension plate 184, and plates 181, 183, and 184 are secured in assembly by long screws 185, a spacer sleeve 186 being used between plates 181 and 183.

Fixed on shaft 179 just below frame plate 181 is a spur gear 190, which meshes with a plurality of smaller spur gears 191, here six in number, and understood to be equally spaced around gear 190. The gears 191 are tight on shafts 192 journalled in bearings 193 and 194 in plates 181 and 193, respectively. Integral with gears 191 are eccentrically-weighted rotors 195, and these are phased so that their unbalanced masses approach and recede from the central axis of the generator in unison with one another, FIGS. 14 and 15 showing them at their innermost positions in full lines, and with their outermost positions indicated in phantom lines in FIG. 15. It will be clear, accordingly, that the forces exerted by the unbalanced rotors along lines radial to the central axis of the generator will counterbalance one another. On the other hand, each pair of diametrically opposed rotors exerts an alternating force couple, exactly as explained in connection with the oscillating torque generator 32 of FIG. 1. The only difference in the case of the present embodiment is that there are three pairs of diametrically opposed unbalanced rotors, and it will be evident that the alternating force couples of the several pairs of rotors will be in phase, and therefore additive. The generator thus produces a strong torsionally oscillating force couple or torque which is evidently applied through the gear shafts 192 to the assembly of frame plates 181, 183, and 184, causing an oscillation of the latter as will appear. Preferably, though not necessarily, a spring element 196 may connect housing 163 with the oscillatory generator assembly, thus establishing a normal centralized position for the generator, and preventing progressive rotation thereof within the housing. In some installations it is desirable to eliminate this constraint, and to allow the tubing to rotate slowly, so as to distribute wear.

Tubing string 162 is supported from lower generator plate 184 through a tubular stem 197, which extends through a central bore 198 in plate 184, the upper extremity of said stem 197 having an external flange or head 199 resting on a shoulder 200 in plate 184 formed by an enlarged counterbore 201 extending downwardly into plate 184. Stem 197, which has a longitudinal bore 197a, and ports 197b communicating said bore to outflow passage 174, is coupled to the upper end of tubing string 162 as by coupling 202. The entire weight of the tubing string is thus borne by shoulder 200 on generator plate 184. Plate 184 is in turn supported for anti-friction oscillation by a bearing 205 seated on casing head H. Stem 197 is packed within casing head member 168 by means of chevron packings 206 placed in bore 171 above and below radial outflow passage 174, coil springs such as indicated at 207 holding the packings properly compressed against shoulder 173 at the bottom, and a retainer plate 208 at the top. A packing ring 210 is preferably also used between bottom generator plate 184 and the casing head outside bearing 205, as indicated in FIG. 14.

The oscillatory torque generated within the frame assembly of generator 163 is exerted on the upper end portion of stem 197, and therefore on the tubing string 162 below, the weight of the tubing string assuring a sufficiently tight frictional engagement between generator plate 184 and tubing flange 190 to assure that the oscillatory torque so developed is applied to stem 197 and the tubing string 162 below. Thus, the generator is torsionally loaded by the tubing string, and oscillates torsionally through a limited angular displacement as determined by the torsional elastic stiffness and moment of inertia of the tubing string.

Directing attention now to the tubing string itself, it will be seen that there is exerted on the upper end thereof an alternating force couple. This results in a wave of torsional elastic displacement being transmitted down the tubing string with the velocity of torsional sound waves in the material of the tubing string. The tubing string is fabricated of elastic material, as steel, with good elastic fatigue properties. If the generator is driven by its drive motor 164 at a frequency corresponding to a frequency for torsional wave resonance in the tubing string, the torsional wave so sent down the tubing string is reflected from the lower end thereof and arrives back at the top end of the tubing in proper phase to be reinforced by a succeeding torsional force couple then being delivered from the generator, and a condition of torsional standing wave resonance is thereby attained. Under such circumstances, velocity antinodes V (regions of maximum torsional displacement), will appear at the extremities of the tubing and at half-wavelength spaced points therealong, as indicated in FIG. 13. In the case of such standing wave operation, couplings 162a are preferably located at the antinodes, for a reason to appear presently. Intervening between these velocity antinodes are regions of minimized or zero torsional displacement, called nodes. It is, incidently, preferable to locate the bearing elements 162b at the nodes, as indicated diagrammatically in FIG. 13. On opposite sides of each node, the tubing is twisted in opposite directions, the angular displacement increasing progressively from each node to each antinode. Thus different portions of the tubing are torsionally displaced in opposite directions; and it will be seen that successive half-wavelength lengths of tubing are twisted in reverse directions, the points of zero twist occurring at the nodes. With such a resonant, standing wave system, it becomes advantageous, as will appear hereinafter, to locate the subsequently described fluid impellers within the tubing couplings 162a at the antinodes, where the torsional motion is maximized. Other effective modes of resonance include patterns which do not necessarily coincide with tubing section lengths.

It is, however, found quite practicable to operate the pumping system of FIGS. 13 to 16 without necessarily establishing resonance. In this case, torsional traveling waves are propagated the length of the tubing, and the points of maximum torsional displacement travel longitudinally of the tubing at the speed of sound. These longitudinally travelling torsion waves torsionally oscillate the fluid impellers, and effect pumping as will subsequently appear.

One illustrative form of tubing impeller adapted for installation in the tubing string 162 is shown in FIGS. 17 to 19. The tubing string is indicated at 162, and one of the tubing couplings 162a, for example, the lowermost coupling of FIG. 13, is shown. A vane assembly 216 is mounted in the tubing in the region of the coupling collar 162a. In this instance, it includes a lower base plate or disc 217 seated on the upper end of the lower, threaded tubing coupling pin 162′, and retained thereagainst by means of a coil compression spring 218 engaging the lower end of the tubing coupling pin 162″ immediately above. A standard 220 is mounted in the center of disc 217, and supports at its top an upper disc 221, of somewhat lesser diameter than the inside diameter of the tubing string, whereby to afford an annular flow passage 222 therebetween. A plurality of fluid impeller vanes 223 are mounted on vertical pins 224 set tightly at the top in disc 221 and at the bottom in disc 217. The impeller vanes 223 have hubs 225 fitted tightly on pins 224, as by being molded thereon, and have vane or blade portions 226 projecting from the hubs in a direction normally radial of the tubing. These vanes are preferably flexible, and may be composed of rubber, or suitable plastic such as nylon, Teflon, etc.

Disc 217 is apertured at 228 for upward fluid flow from below into the space between the vanes and the central standard 220. The fluid flow path is upwardly through apertures 228, outwardly between the vanes, and thence upwardly via annular space 222.

As the portion of the tubing in the region of the vane assembly 216 is torsionally oscillated, the vanes, acting against the fluid therebetween, propel the fluid radially outward. The relief of the resulting pressure is upward via the annular channel 222, and the fluid thus flows upwardly therethrough, and so upwards in the pump tubing, to be delivered from the casing head via passage 174. Using the preferred feature of flexible vanes, the propulsive effect is obtained as explained previously in connection with earlier embodiments of the invention. The operation of the flexible vanes is well illustrated in FIGS. 18a and 18b. In some situations, a single impeller unit may be employed, located near the lower end of the pump tubing, and at a velocity antinode of the torsional standing wave if such a wave is to be established. Usually, however, a number of the impeller units are used along the tubing; and if a standing wave is established, these are most advantageously at the velocity antinodes. They may be at half wavelength spacing, or integral multiple thereof. Furthermore, in deep wells there are no true nodes, and the impellers are effective at any location along the elastic column. The series of impellers gives a series booster performance that is important to effective pumping in most wells.

FIGS. 20 and 21 show a modified impeller vane assembly of a rigid vane type, located within a tubing coupling like that of FIG. 17, and the parts of which are identified by like reference numerals. In this case, the mounting for the vanes comprises an inverted-cup-like member 230, whose rim flange 231 is mounted in the coupling in the fashion of the mounting of disc 217 of FIG. 17. Member 230 is formed with a central aperture 232, for upward passage of fluid, and rising from member 230 outside said aperture are fixed or rigid, radially disposed vanes 233, to the upper edges of which is secured a supporting disc 236. The outside diameter of the disc assembly is less than the inside diameter of the tubing, so as to afford a fluid channel 234. Oscillation of the vane assembly results in the fluid between the vanes being impelled radially outward into channel 234, and thence upward in the tubing. FIG. 22 shows a modified vane contour for the device of FIG. 20, wherein the vanes 236 are tapered in the outward direction, preferably having tapering, concave side surfaces 237.

FIGS. 23–26 show another embodiment of vane impeller means positioned within the pump tubing 162. The impeller in this case comprises upper and lower cylindrical heads 240 and 241, respectively, joined by a cylindrical intermediate or neck portion 242 of reduced diameter, the heads 240 and 241 being dimensioned for reception in tubing 162 with a small clearance, as shown. O-ring seals 243 and 244 around heads 240 and 241, respectively, seal to the inner surface of the tubing. Lower head 241 carries a bow spring 245 which engages the inner walls of tubing 162 under spring pressure to hold the assembly in position in the tubing. For this purpose, the normal position between the sides of the bow spring is made somewhat greater than the inside diameter of the tubing, so that the spring must be compressed somewhat in order to be received in the tubing. The spring pressure thus developed is adequate to position the impeller assembly in selected position within the tubing. Upper head 240 is equipped with a bail 246 which may be engaged by a suitable tool for purpose of running the assembly into or removing it from the pump tubing.

Positioned on the upwardly facing shoulder 247 at the juncture of lower head 241 with reduced portion 242 is one or more vanes 248. In this case, there are two of such vanes 248 positioned at diametrically opposite points on the shoulder 247. Also, illustratively, the vanes 248 are of triangular form with two oppositely inclined vane surfaces 249 meeting at a crest 250. The base of the triangular vane rests flat on shoulder 247, and a screw 251 secures the vane to member 242.

Two fluid passages 252 extend from the center of the lower face of lower head 241, upwardly and diagonally outward to open through the outer surface of member 242 at points between the vanes 248, thus establishing fluid communication between the space below lower head 242 and the annular spaces around member 242 between the vanes 248.

Formed in upper head 240 directly over vanes 248 are keystone-shaped slots or fluid ports 254.

It will be understood that impellers as described are positioned in pump tubing 162 at points in the latter which undergo substantial torsional oscillation during operation of the pumping system. They may, for example, be position at selected velocity antinodes in the tubing 162 if a torsional standing wave is established in the tubing. Because of the frictional engagement of the impellers with the walls of the tubing, the impellers oscillate with the torsionally oscillating tubing. Assuming well liquid to stand in the tubing at a level sufficiently high to fill the annular space around the reduced neck portion 242 of the impeller, upward pumping action is developed as follows. On each torsional stroke of the assembly in one direction, impeller vane surfaces 249 facing in the direction of the stroke act to lift the fluid immediately forwardly thereof, causing it to rise through the port 254 immediately above. The angular acceleration of the device in course of its stroke greatly exceeds the acceleration of gravity, and at this high acceleration fluid forwardly of the advancing vane surface is deflected upwards through the port 254. It will also be seen that the vane, so accelerating against the liquid, will develop in the liquid near the vane a positive pressure pulse exceeding the liquid column pressure. The pressurized liquid near the vane moves upwardly through the port 254 by reason of this localized pressure development, as well as by the deflecting force of the vane. Fluid so impelled upwardly through the port 254 by the advancing vane is elevated with such acceleration and velocity that the void tending to be formed in back of the vane is filled with fluid from below rather than with return flow from above. Fluid from below is at the same time pumped upwardly and outwardly via the passages 252 to fill this void with the aid of centrifugal force developed in passages 252 during the stroke. On the next succeeding stroke, i.e., in the reverse direction, a similar performance takes place, so that upward pumping is accomplished on each torsional stroke.

Figure 27:
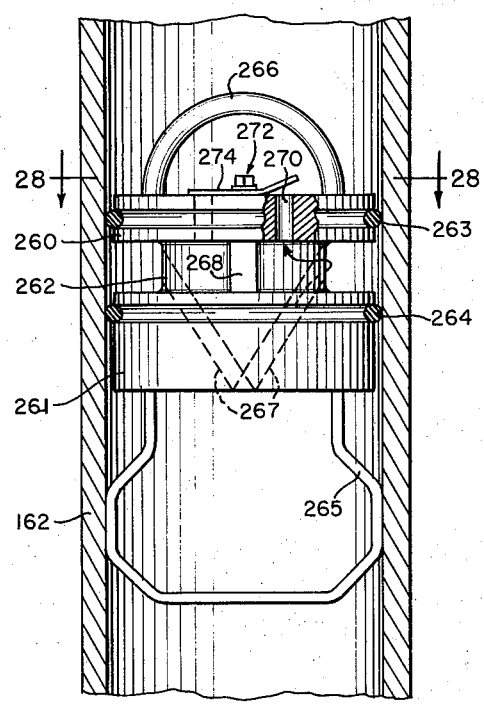
FIG. 27 is a view similar to FIG. 23 but showing a modification.
Figure 28:
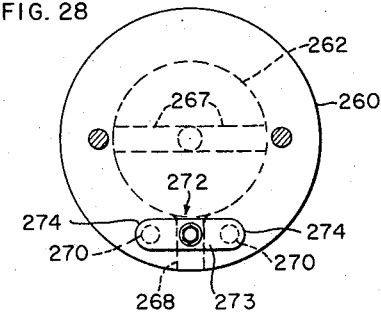
FIG. 28 is a plan view of the impeller of FIG. 27.

FIGS. 27 and 28 show another modification of impeller installed in pump tubing 162. In this instance, the impeller comprises an upper disc-like member 260, a lower, thicker disc or head 261, and a cylindrical interconnecting intermediate or neck portion 262 of reduced diameter. O-ring seals 263 and 264 seal the members 260 and 261, respectively, to the inner surface of the tubing, and a bow spring device 265, like that described for the preceding embodiment, engages the tubing for positioning purposes. The upper disc 251 is provided with a bail 266. Liquid passages 267 extend upwardly and angularly outwardly through lower head 261 and neck portion 262 from an inlet port in the center of head 261 to outlet ports at diametrically opposite points in the sides of neck portion 262. Intersecting the annular space around neck portion 262, midway between the points of communication of passages 267 with said space, is an abutment or fluid impelling vane 268. This abutment or vane is formed integrally with members 260, 261 and 262, and extends the full distance from the perimeter of member 262 to the perimeters of members 260 and 261. The radially inner end of the vane nearest the axis of pump tubing 162 is, in effect, the head of the vane and the radially outer end of the vane is its tail.

A pair of fluid ports 270 are formed in disc 260 outside the diameter of neck portion 262, and adjacent the abutment 268, one on each side thereof. A check valve device generally designated by numeral 272 normally closes these ports 270. As here shown, the check valve device 272 comprises a flexible plate 273 fastened to the top side of disc 260 at its center and comprising two flexible flap elements 274 covering and normally closing the ports 270.

The impeller as thus described is oscillated by the torsionally oscillating section of the tubing in which it is positioned, as in earlier embodiments described hereinabove. Moreover, as in earlier embodiments, the torsional stroke involves an acceleration substantially exceeding that of gravity. Assuming well fluids to stand in tubing 162 to a level such that the annular space 262a around the neck portion 262 of the impeller is filled with fluid, the abutment or vane 268, accelerating against the liquid in the space 262a, creates a positive pressure pulse in a localized portion of the liquid immediately adjacent the abutment, and this positive pressure pulse is exerted through the adjacent port 270, and is sufficient to elevate the check valve flap 274 against column pressure, with the result that an increment of liquid is forced upwardly through port 270 and past the check valve. At the same time, liquid rises through passages 267, either because of centrifugal force, or suction developed by reason of liquid having been forced upwardly past check valve flap 274, or both. On the reverse stroke, the performance is repeated, with liquid pumped upwardly through the port 270 on the opposite side of abutment 268. It is significant to note that the vane or impeller acts normal to the liquid column in the space 262a, so that the impeller motive can be said to be longitudinal in direction. It must be recognized that this invention is not limited to angular or lateral action of the impeller.

Figure 29:
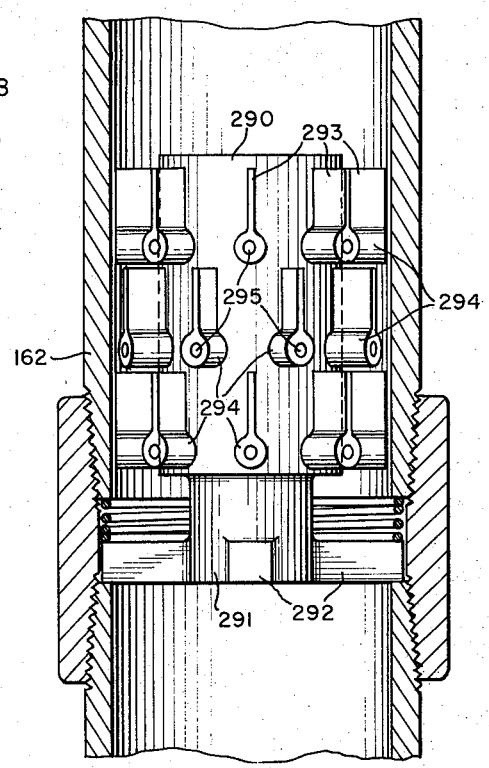
FIG. 29 is a view showing an alternative impeller for use in the pump tubing of the system of FIG. 13.

Another embodiment of impeller vane assembly for use in the pump tubing 162 is shown in FIG. 29. In this case, a cylindrical body 290 has at its lower end a reduced stem 291, from the lower extremity of which project a plurality of lugs 292 engaging in the tubing coupling in the manner already described in connection with the embodiment of FIGS. 17–19. Mounted on cylindrical body 290 are a plurality of flexible vanes 293, arranged in this instance in three tiers of eight vanes each, with the vanes of successive tiers staggered, as illustrated. The vanes 293 have hubs 294 fitted tightly on pins 295, which pins are in turn fitted tightly in cylindrical body 290 so as to project radially from the latter. As appears in FIG. 29, the outside diameter of the tiers of vanes is slightly less than the inside diameter of the pump tubing. The vanes are preferably flexible, and may be composed of rubber, or suitable plastic such as nylon, Teflon, etc.

As the portion of tubing 162 in the region of the vane assembly is torsionally oscillated, the vanes, acting against the fluid therebetween, propel the fluid in an upward direction. The action of the individual vanes on the fluid is as described in connection with earlier embodiments of the invention employing vanes of the type here shown.

Figure 30:
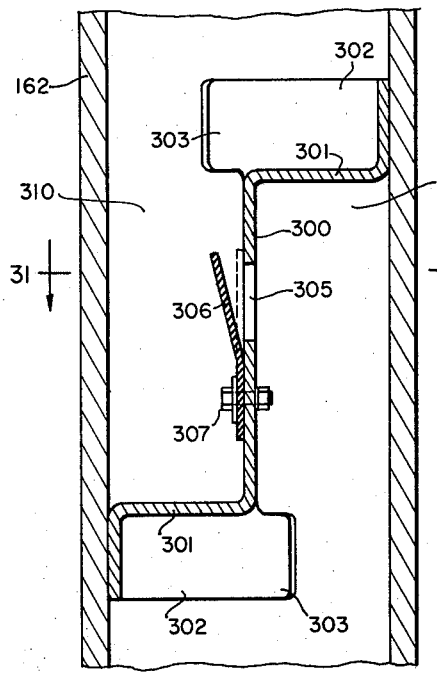
FIG. 30 is a view showing another embodiment of impeller for use in the pump tubing of FIG. 13, being a section taken on broken line 30—30 of FIG. 31.
Figure 31:
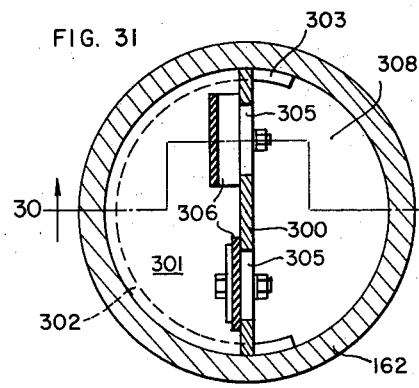
FIG. 31 is a section taken on line 31—31 of FIG. 30.

FIGS. 30 and 31 show still another variety of impeller for use in the torsionally oscillatory pump tubing 162. A vertical plate 300, of a width such as to extend medially across the tubing, is formed at the top and bottom with oppositely projecting semicircular walls 301 which extend to the interior wall surfaces of the tubing, thus forming a barrier across the tubing. This wall structure may be mounted in the tubing in any suitable manner.

As here shown, the semicircular wall portions 301 are provided with cylindric collar portions 302 adapted to fit snugly within the tubing, and including ears 303 projecting somewhat beyond the vertical wall 300. These ears are normally expanded somewhat outside the circumference of the inside wall surface of the tubing, and are resiliently bent inwardly as the impeller is inserted inside the tubing, so as to bear against the inside surfaces of the tubing with a substantial degree of spring pressure. The impellers are thus frictionally supported against the tubing walls.

The wall 300 is formed on each side of the central longitudinal axis of the tubing with a fluid port 305, and these fluid ports are normally closed by spring check valve plates 306 mounted on one side of the wall 300. As shown, these plates are mounted at their ends on the wall 300 to one side of the ports 305, as indicated at 307. Normally, these plates 306 lie flat against the wall 300, closing the ports 305, as shown in dotted lines in FIG. 30. The plates alternately open and close the ports 305 by resilient deflection, as to the position shown in full lines in the figures.

Operation of the impeller of FIGS. 30 and 31 is as follows. As the portion of the tubing 162 twists in one direction, for example, in a clockwise direction as viewed in FIG. 31, one half of the wall member 300 advances against well fluid which has risen in the tubing to fill the region 308, while the other half of the wall portion 300, i.e., that on the opposite side of the longitudinal axis of the tubing, tends to recede therefrom. Because the torsional "unwinding" of the tubing 162 occurs with high angular acceleration, considerably greater than the acceleration of gravity, a positive pressure pulse is created in the well fluids adjacent the advancing portion of the wall 300, and the pressurized fluid deflects valve plate 306 to the open position shown in the drawings, whereby an increment of well fluid passes through the port from the space 308 on one side of the wall to the space 310 on the opposite side thereof. Fluid also passes through the port 305 in the accelerating wall 300 owing to the inertia of the fluid. The passage of fluid through the port 305 tends to create a void in the fluid in space 308 in the region of the half of wall 300 that is receding relative to said fluid, thereby developing a suction draw-up well fluids from below. Toward the end of the stroke, the opened check valve plate closes; and during the reverse stroke, the previously opened check valve plate 306 remains closed, while the check valve plate in the opposite half of wall 300 now opens and passes an increment of well fluid from space 308 to space 310. The oscillation taking place at a substantial oscillation frequency, for example, in the typical range of from 50 to 200 cycles per second, and the acceleration at such frequency being relatively great, increments of the fluid are alternately impelled to pass through the two check valved ports, and the fluid is pumped up the tubing against column pressure. As with the other types of impeller described hereinabove, it is generally desirable to use a number of the impellers along the tubing.

Figure 32:
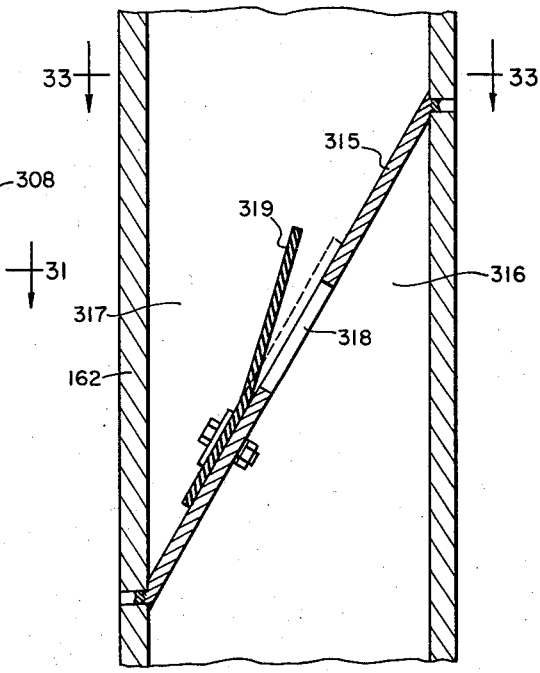
FIG. 32 is another embodiment of fluid impeller for use in the pump tubing of the embodiment of FIG. 13, being a section taken on broken line 32—32 of FIG. 33.
Figure 33:
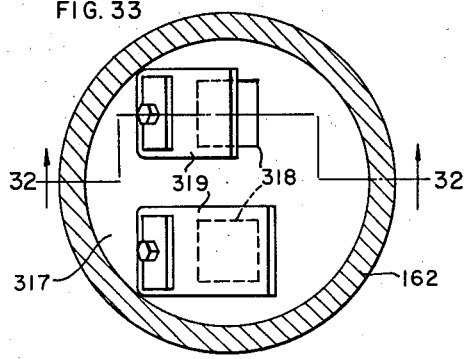
FIG. 33 is a section taken on line 33—33 FIG. 32.

In FIGS. 32 and 33 is one further embodiment of impeller, adapted for use in the torsionally oscillatory pump tubing 162, and being of the same general class as the embodiment shown in FIG. 30. In this case, a slanting wall 315 extends across the interior of the pump tubing, being secured in place as by welding. This plate divides the tubing into liquid spaces 316 and 317, and it contains, on opposite sides of the longitudinal axis of the tubing, two fluid ports 318, controlled by spring-plate check valve devices 319 of the same type as described in connection with FIGS. 30 and 31. The operation of the embodiment of FIGS. 32 and 33 is similar to that of FIGS. 30 and 31, the slant position of the ports and check valve plates having no effect upon the operation, excepting that the effective areas of ports 318 and plate 315 are reduced to their horizontally projected areas, as should be obvious. The design of FIGS. 32 and 33 is advantageous for its mechanical simplicity.

FIGS. 34 to 36 show one further embodiment of torsional deep well pump in accordance with the invention, this embodiment differing from that disclosed herein, first, in the substitution, for the inertia weight oscillating torsion generator, of a type of generator involving a positive displacement stroke action, second, in the use, for transmission of torsional wave energy down the well, of a solid elastic shaft rather than the pump tubing, and finally, in the use of a somewhat modified form a fluid impeller. In FIG. 34, numeral 340 designates generally a fragmentary illustrated pump tubing, which will be understood to be provided at the top with a suitable head furnished with a production flow tube, such as illustrated, for example, in FIG. 2 of my aforementioned Patent No. 2,444,912. This pump tubing 340 will further be understood to be annularly spaced inside a well casing, not shown, and to terminate at its lower end somewhat below the illustrated impeller means in open communication with the well fluids within the casing. In some installations the well tubing is dispensed with, the impeller being fitted to the casing itself, and in such instances 340 designates the casing. At 341, just above the tubing head, is the positive displacement oscillating torque generator which is drivingly coupled to the upper extremity of elastic, torsion wave transmission shaft or column 342, the latter carrying fluid impelling means 343 at its lower end. Shaft 342 is packed in tubing head, not shown, for example as shown in FIG. 2 of Patent No. 2,444,912.

Generator 341 comprises a housing 344 furnished with a cover plate 345, and having at the bottom a tubular boss 346 receiving the upper end portion of shaft 342, and accommodating also packing means 347 for the shaft. Affixed to the upper extremity of shaft 342 is the hub 348 of a crank arm 349, and hub 348 rests on the inner race ring of a thrust bearing 350 supported on the lower wall of housing 344, as clearly shown. It will be seen that shaft 342 is supported from the lower wall of housing 344. The housing 344 will in turn be understood to be provided with any means of vertical support, not shown.

In housing cover plate 345 is mounted a bearing 352 for a drive shaft 353, on the lower end of which, below cover plate 345, is fixed a crank disc 354, and a connecting rod 355 pivotally connects crank pin 356 carried by crank arm 349 with crank pin 357 carried by crank disc 354. The effective length of crank arm 349 is sufficiently greater than that of crank disc 354 that continuous rotation of shaft 353 (driven by any suitable prime mover, not shown) results in oscillation of crank arm 349 and of the upper end portion of shaft 342.

In deep well operation, shaft 353 is driven at a speed such that the oscillation frequency of crank arm 349 and the upper end portion of shaft 342 will be high enough to cause torsional elastic vibration of shaft 342, rather than merely bodily oscillation thereof, as is the case in shallow wells. In general, though without implied limitation, the oscillation frequency will ordinarily, in practice, be high enough to establish in the shaft a wave pattern at least a half wavelength long, causing the two half length portions of the shaft to twist elastically always in reverse directions on opposite sides of a node. And usually, the frequency will be high enough that a wave pattern a number of half waves long will be established. Such torsional wave action in the shaft causes its lower extremity, and the fluid impelling means carried thereby, to oscillate torsionally.

The fluid impelling means 343 here chosen for illustrative purposes comprises a disc 360 fitted fairly closely within tubing 340, so as to seal fairly effectively against fluid flow therepast, and adapted to oscillate torsionally therein with the lower extremity of the shaft 342. Projecting downwardly from disc 360 in a generally sector-shaped element 361, whose arcuate surface 362 is coextensive with the periphery of disc 360. The radial side surfaces 363 of this sector-shaped element 361 are undercut to afford curved vane surfaces or scoops, as clearly illustrated in FIGS. 34 and 36.

Disc 360 is deformed with a pair of ports 365, opening through the bottom of the disc immediately adjacent and over the vane or scoop surfaces 363. These ports are normally closed at the top of the disc by check valve elements in the form of flexible spring flaps 366, fastened down to disc 360 to one side of the ports, as at 367. In some instances, especially at high frequency operation, the acceleration impulses against the scoop surfaces 363 are so great that the check valves 366 can be eliminated.

In the operation of the pump, well fluids rise in tubing 340 to the level of the bottom surface of disc 360, occupying the channel space 370 immediately below disc 360 and between sector element 361 and the inside wall surfaces of the tubing. It has previously been described how the lower end portion of shaft 342 vibrates or oscillates torsionally as a result of torsional wave action set up in the shaft by generator 341. The disc 360 oscillates torsionally with the lower end portion of the shaft, and the side surfaces 363 of the sector-shaped element 361 accordingly alternately move against and recede from the well fluids within the channel space 370. The disc 330, after having been fully rotated to one of its extreme positions of oscillation, then accelerates torsionally in the reverse direction; and the advancing surface 363, accelerating against the liquid in channel 370, develops a pressure in the liquid immediately thereadjacent, causing a charge of the liquid to rise through the corresponding port 365 and past the spring check valve element 366 to the fluid column space above. The fluids are also impelled to rise through ports 365 by reason of the curvature of the surfaces 363, which act to deflect the fluids upwardly. The curvature of the surfaces 363 thus gives these surfaces a vane or scoop action, imparting to the fluids an upward component of travel. Each charge of well fluid so impelled upwardly through a port 365 and past a check valve element 366 develops a corresponding pressure depletion in the channel space 370, causing well fluids to rise into said space from below. Charges of fluid are thus impelled upwardly through the two ports 365 alternately on reverse torsional strokes of the disc 360. Of course, each time a charge of well fluid is so impelled through a port 365 and past a corresponding check valve element 366, the latter then closes to prevent reverse flow. The fluid column in tubing 340 above disc 360 is thus incrementally elevated on each torsional stroke of the impelling means.

A number of illustrative embodiments of the invention have now been described and illustrated. It will of course be understood that these are for illustrative purposes only, and that various additional forms of the invention are possible within the scope of the invention defined by the broader of the appended claims.

I claim:

1. In a fluid pump, the combination of: a torsionally elastic energy storage system having mass and torsional elastic stiffness adapted for torsional elastic oscillation about an axis, said system having longitudinally adjacent portions simultaneously torsionally elastically deformable in reverse directions about and with reference to an intermediate neutral portion, a cyclic torque generator drivingly coupled to one of said torsionally elastically deformable portions for applying a cyclic torque thereto at a frequency such that said adjacent portions of said energy storage system torsionally oscillate in reverse directions by elastic deformation about said neutral portion, and fluid impelling means coupled to and angularly oscillated by one of said torsionally elastically deformable portions of said energy storage system.

2. In a fluid pump, the combination of: a torsionally elastic torsional vibration transmission means having a torsion axis and adapted for torsional elastic deformation oscillation about said axis, a cyclic torque generator coupled to a torsionally elastically deformable portion of said transmission means for torsionally elastically vibrating said means about said axis at a frequency sufficiently high that adjacent portions of said transmission means are simultaneously elastically deformed in opposite directions, and fluid impelling means drivingly coupled to a torsionally vibrating portion of said transmission means.

3. The subject matter of claim 2, wherein said fluid impelling means comprises a plurality of fluid impelling vanes.

4. The subject matter of claim 2, wherein said fluid impelling means comprises a plurality of fluid impelling vanes mounted on a torsionally deformable portion of said torque transmission means.

5. The subject matter of claim 2, wherein said cyclic torque generator has a frequency corresponding to a resonant frequency of said transmission means for a mode of torsional elastic oscillation.

6. The subject matter of claim 2, wherein said fluid impelling means comprises a plurality of vanes having head and tail portions, with said head portions mounted on said torsionally oscillating portion of said transmission means, said vanes being positioned in radial planes intersecting said torsion axis, with their head portions nearest said axis and their tail portions directed radially outward therefrom.

7. In a fluid pump, the combination of: a torsionally elastic shaft, a cyclic torque generator coupled to one end portion of said shaft for cyclically twisting said end portion of said shaft about the longitudinal axis thereof at a frequency such that the shaft torsionally oscillates in opposite directions about a neutral point between the ends thereof, a disc drivingly coupled for oscillation about its center axis to a torsionally oscillatory portion of said shaft, a plurality of fluid impelling vanes having head and tail portions, means mounting said head portions of said vanes on said disc, with said vanes positioned in radial planes intersecting said center axis of said disc, the head portions of said vanes being nearest said axis, and the tail portions thereof being directed radially outward.

8. The subject matter of claim 7, wherein said disc is torsionally elastically compliant.

9. In a fluid pump, the combination of: a torsionally elastic vibration transmission means mounted for angular oscillation about an axis, a cyclic torque generator coupled to said transmission means for cyclically elastically vibrating it torsionally about its said axis, whereby longitudinally adjacent portions of said transmission means are simultaneously elastically torsionally deformed in opposite directions, fluid impelling vanes mounted on said transmission means and oriented thereon to have a component of lateral oscillation when said transmission means is angularly oscillated, and wall means cooperating with said transmission means to define a fluid conduit enclosing said vanes and leading in the direction of fluid propulsion by said vanes.

10. In a fluid pump, the combination of: a cylindric torque transmission means adapted for angular oscillation about its longitudinal axis, a cyclic torque generator coupled to said transmission means for cyclically oscillating it about its said axis, fluid impelling vanes mounted on said cylindric transmission means and directed longitudinally thereof, and a cylindric conduit wall concentric with and annularly spaced from said cylindric transmission means so as to define with the latter a fluid conduit containing said fluid impelling vanes.

11. In a fluid pump, the combination of: a torsionally elastic shaft, a cyclic torque generator coupled to one end portion of said shaft for cyclically elastically twisting said end portion of said shaft about the longitudinal axis thereof, and fluid impelling means coupled to the opposite end portion of said shaft, said cyclic torque generator being operable at a frequency such that the shaft cyclically twists elastically simultaneously in opposite directions about a neutral point between the ends thereof and thereby undergoes torsional elastic oscillation in reverse directions about said neutral point.

12. In a fluid pump, the combination of: a torsionally elastic shaft, a cyclic torque generator coupled to one end portion of said shaft for cyclically elastically twisting said end portion of said shaft about the longitudial axis thereof, fluid impelling means coupled to the opposite end portion of said shaft, said cyclic torque generator being operable at a frequency such that the shaft cyclically twists elastically simultaneously in opposite directions about a neutral point between the ends thereof, and mounting means for said shaft clamping it at said neutral point.

13. In a fluid pump, the combination of: a torsionally elastic shaft, a cyclic torque generator coupled to one end portion of said shaft for cyclically elastically twisting said end portion of said shaft about the longitudinal axis thereof at a frequency such that the shaft cyclically twists elastically simultaneously in opposite directions about a neutral point between the ends thereof, and fluid impelling means mounted on said shaft between the point of coupling of said torque generator thereto and said neutral point.

14. The subject matter of claim 11, wherein said cyclic torque generator has a frequency corresponding to a resonant frequency of said shaft for a mode of torsional elastic deformation thereof.

15. In a fluid pump, the combination of: a torsionally elastic shaft, a cyclic torque generator coupled to one end portion of said shaft for cyclically elastically twisting said end portion of said shaft about the longitudinal axis thereof at a frequency such that the shaft cyclically twists elastically simultaneously in opposite directions about a neutral point between the ends thereof, and fluid impelling means coupled to one end portion of said cyclically twisting shaft.

16. In a fluid pump, the combination of: a torsionally elastic shaft, a cyclic torque generator coupled to one end portion of said shaft for cyclically elastically twisting said end portion of said shaft about the longitudinal axis thereof at a frequency such that the shaft twists elastically simultaneously in opposite directions about a neutral point between the ends thereof, a plurality of fluid impelling vanes carried by a torsionally oscillatory portion of said shaft between said cyclic torque generator and said neutral point, a pump casing surrounding said fluid impelling vanes and the portion of said shaft carrying said vanes, means sealing said casing to said shaft, said casing defining a fluid flow chamber around said fluid impelling vanes, and fluid inlet and outlet ports communicating with said chamber.

17. In a fluid pump, the combination of: a torsionally elastic shaft, a pump casing including a shaft-mounting wall surrounding and tightly embracing said shaft and sealed thereto at a shaft mounting point between the extremities of said shaft, said casing also including walls joined to said saft mounting wall and surrounding the portion of said shaft from said mounting point to one shaft extremity, said walls accommodating torsional oscillation of said portion of said shaft beyond said shaft-mounting wall, and defining a longitudial fluid channel therealong, fluid inlet and outlet ports in said walls commuicating with said channel and spaced longitudinally of said shaft portion, fluid impelling means on said shaft between said inlet and outlet and directed toward said outlet, and a cyclic torque generator coupled to the portion of said shaft outside said casing at a point longitudinally spaced along the shaft from said shaft-mounting wall in a manner to torsionally elastically twist said last mentioned portion of the shaft about the longitudinal axis thereof at a frequency such that portions of the shaft inside and outside the casing torsionally oscillate in opposite directions.

18. In a fluid pump, the combination of: a torsionally elastic shaft, a pump casing including a shaft-mounting wall surrounding and tightly embracing said shaft and sealed thereto at a shaft mounting point between the extremities of said shaft, said casing also including walls joined to said shaft mounting wall and surrounding the portion of said shaft from said mounting point to one shaft extremity, said walls accommodating torsional oscillation of said portion of said shaft beyond said shaft-mounting wall, and defining a longitudinal fluid channel therealong, fluid inlet and outlet ports in said walls communicating with said channel and spaced longitudinally of said shaft portion, fluid impelling means on said shaft between said inlet and outlet and directed toward said outlet, and a cyclic torque generator coupled to the extremity of the portion of the shaft outside the casing in a manner to exert a periodic torque thereon about the longitudinal axis of the shaft, the shaft portions inside and outside the casing being of comparable lengths, and the cyclic torque generator having an operating frequency corresponding substantially to the frequency of the shaft for a half-wavelength mode of torsional standing wave vibration thereof, with a velocity mode at the mounting point of the shaft, and velocity antinodes at the extremities thereof.

19. The subject matter of claim 18, wherein said impelling means comprise a plurality of fluid impelling vanes oriented in the direction of fluid flow in said flow channel in said casing.

20. The subject matter of claim 19, wherein the inlet port is nearest the shaft-mounting wall, and the outlet port is nearest the extremity of the shaft portion inside the casing.

21. In a fluid pump, the combination of: a torsionally elastic column, a cyclic torque generator coupled to a portion of said column for cyclically elastically twisting a portion of said column about the longitudinal axis thereof and thereby setting up torsional elastic oscillation of said column, said torque generator being operable at a frequency such that the column divides into adjacent oppositely elastically twisting oscillatory half-wave length portions between which the column stands substantially stationary, said torque generator being coupled to a portion of said column substantially spaced from a substantially stationary point thereof, and fluid impelling means mounted on said column on a torsionally oscillatory portion thereof.

22. In a fluid pump, the combination of: a torsionally elastic column, an alternating torque generator coupled to a portion of said column for cyclically elastically twisting a portion of said column about the longitudinal axis thereof and thereby setting up torsional elastic oscillation of said column, said torque generator being operable at a frequency such that the column divides into adjacent oppositely elastically twisting oscillatory half-wave length portions between which the column stands substantially stationary, said torque generator being coupled to a portion of said column substantially spaced from a substantially stationary point thereof, and fluid impelling means on said column on a plurality of said half-wave length portions thereof.

23. In a deep well pump, the combination of: an elastic pump tubing positioned in the well and having an inlet at its lower end and an outlet at its upper end, a cyclic torque generator operatively coupled to the upper end portion of said tubing for periodically elastically twisting said upper end portion of said tubing at a frequency to develop elastic torsional waves in said tubing travelling longitudinally thereof, and fluid impeller means in said tubing between said inlet and said outlet for impelling fluids upwardly in said tubing in response to torsional wave motion of said tubing.

24. The subject matter of claim 23, wherein said cyclic torque generator is operable at a frequency to develop a torsional standing wave in said tubing, and wherein said fluid impelling means is situated in the region of a velocity antinode of said standing wave.

25. The subject matter of claim 23, wherein said fluid impeller means embodies a plurality of fluid impeller vanes.

26. The subject matter of claim 23, including a frame mounted in said tubing to oscillate in response to torsional wave motion of said tubing, said frame comprising an annulus disposed across said tubing with a liquid port extending upwardly therethrough, circumferentially spaced posts extending upwardly from said annulus around said port, vanes mounted on said posts and extending radially outward in the tubing, said vanes being in communication with said port in said annulus, and an imperforate head wall connecting the upper ends of said posts, said head wall being spaced inside said tubing to form an annular liquid channel therepast which communicate with the spaces between said vanes.

27. The subject matter of claim 23, wherein said fluid impeller means comprises a body mounted in said tubing and oscillating with said torsional waves in said tubing, a circumferential channel in said body, an abutment across said channel, there being a fluid passage in said body establishing communication between said channel and well fluids in the tubing therebelow, and there being a fluid passage in said body establishing communication between said channel and the space in the tubing above said body, and a check valve controlling said last mentioned passage.

28. In a deep well pump, the combination of: a column of solid elastic material positioned within the well, a cyclic torque generator operatively coupled to the upper end portion of said column for periodically elastically twisting said upper end portion of said column at a frequency relative to the length of the column which develops elastic torsional waves in said column travelling longitudinally thereof, and fluid impeller means carried by said column for impelling fluids upwardly in said well in response to torsional wave motion of said column.

29. In a fluid pump, the combination of: fluid impelling means torsionally oscillative about a predetermined axis, a torsionally elastic transmitter of torsional elastic vibrations disposed on said axis intercoupled with said fluid impelling means, and an oscillative drive means coupled to said intercoupled fluid impelling means and transmitter of torsional elastic vibrations for effecting torsional oscillation of said fluid impelling means and torsional elastic vibration of said transmitter of torsional elastic vibrations at a frequency sufficiently high that adjacent portions of said transmitter are simultaneously elastically deformed in opposite directions.

30. The subject matter of claim 29, wherein said oscillative drive means is drivingly coupled to said transmitter of torsional elastic vibrations and said fluid impelling means is driven through said transmitter and by virtue of its torsional elastic vibrations.

31. The subject matter of claim 29, wherein said fluid impelling means includes a vane having a head and a tail.

32. The subject matter of claim 30, wherein said fluid impelling means includes a vane having a head and a tail.

33. The subject matter of claim 29, wherein said fluid impelling means includes a valve.

34. The method of operating a fluid pump having an elastic column and fluid impelling means operatively coupled thereto and adapted for pumping of fluid by virtue of torsional oscillation thereof about the longitudinal axis of said column, that includes the setting up in said column of torsional elastic vibrations at a frequency sufficiently high for the length of the column that longitudinally spaced portions of said column are simultaneously torsionally elastically deformed in reverse directions 35. The method of operating a fluid pump having an elastic column and fluid impelling means operatively coupled thereto and adapted for pumping of fluid by virtue of torsional oscillation thereof about the longitudinal axis of said column, that includes the setting up of a torsional elastic standing wave in said column.

36. In a pump for pumping fluids in a conduit, the combination of: a fluid propelling vane having a head and a flexible and resilient tail, mounting means in said conduit for the head of said vane, and means for oscillating said mounting means with a component of motion laterally of the vane, said vane having mass and elastic stiffness constants proportioned to tune it to resonance at the frequency of oscillation of said mounting means.

References Cited in the file of this patent

UNITED STATES PATENTS

| 128,426 | Rogers | June 25, 1872 |
| 212,944 | Johnson | Mar. 4, 1879 |
| 1,334,935 | Holst | Mar. 23, 1920 |
| 2,164,863 | Babcock | July 4, 1939 |
| 2,343,523 | Bingham | Mar. 7, 1944 |
| 2,503,159 | Lane | Apr. 4, 1950 |
| 2,728,298 | Shafer | Dec. 27, 1955 |
| 2,906,502 | Smith | Sept. 29, 1959 |

FOREIGN PATENTS

| 106,989 | Great Britain | of 1917 |
| 486,575 | Germany | Dec. 28, 1928 |
| 1,157,507 | France | May 30, 1958 |